US008216510B2

(12) United States Patent
Garrett et al.

(10) Patent No.: US 8,216,510 B2
(45) Date of Patent: Jul. 10, 2012

(54) CLEAN ROOM FOOD PROCESSING METHODS

(75) Inventors: Edward S. Garrett, West Liberty, IA (US); Richard D. Woodford, Nichols, IA (US)

(73) Assignee: West Liberty Foods, L.L.C., West Des Moines, IA (US)

(*) Notice: Subject to any disclaimer, the term of this patent is extended or adjusted under 35 U.S.C. 154(b) by 39 days.

(21) Appl. No.: 12/771,584

(22) Filed: Apr. 30, 2010

(65) Prior Publication Data
US 2010/0209567 A1 Aug. 19, 2010

Related U.S. Application Data

(62) Division of application No. 10/818,944, filed on Apr. 6, 2004, now Pat. No. 7,707,931.

(51) Int. Cl.
*A61L 9/00* (2006.01)
*C12C 3/04* (2006.01)
*A23L 3/3409* (2006.01)

(52) U.S. Cl. ............ 422/32; 422/292; 426/418; 426/320

(58) Field of Classification Search .................... 422/32, 422/292; 426/418, 320, 335
See application file for complete search history.

(56) References Cited

U.S. PATENT DOCUMENTS

| | | |
|---|---|---|
| 3,966,980 A | 6/1976 | McGuckian |
| 4,505,126 A | 3/1985 | Jones et al. |
| 4,693,052 A | 9/1987 | Rebmann et al. |
| 4,727,014 A | 2/1988 | Horn et al. |
| 5,043,174 A | 8/1991 | Lindner |
| 5,269,149 A | 12/1993 | Zeidler |
| 5,320,805 A | 6/1994 | Kramer et al. |
| 5,344,365 A | 9/1994 | Scott et al. |
| 5,478,404 A | 12/1995 | Kennamer |
| 5,560,831 A | 10/1996 | Bladen et al. |
| 5,667,829 A | 9/1997 | Herlig |

(Continued)

FOREIGN PATENT DOCUMENTS
DE      27 26 824      12/1977
(Continued)

OTHER PUBLICATIONS

Kraus, Scott, Food Safety, Clean and Cleaner, The National Provisioner, May 2001, pp. 98-102.

(Continued)

*Primary Examiner* — Kevin Joyner
(74) *Attorney, Agent, or Firm* — Boardman & Clark LLP

(57) ABSTRACT

Some food pathogens are not well controlled by lethality treatments followed by refrigeration. A food processing facility according to this invention reduces the likelihood that food pathogens will be able to enter the food processing facility, or spread should they be able to enter. The food processing facility is divided into a plurality of areas, with different areas having different allowed actions that can be taken on the food product, different rules and/or procedures for persons who are allowed entry, and/or different levels of cleanliness. The food processing facility includes a plurality of separate rooms individually, atmospherically and structurally isolated from each other for processing the food product, each including separate single food processing machines lines of series connected food processing, air handling systems, drain systems and/or often-used supplies and tools. If any one of the isolated food processing rooms should become contaminated, that room can be shut down and sterilized without affecting the operation of the other food processing rooms. Different air pressures within different areas limit the possible movement of airborne food pathogens. Sanitizing stations are placed between various ones of the different areas.

23 Claims, 9 Drawing Sheets

U.S. PATENT DOCUMENTS

| | | | |
|---|---|---|---|
| 5,744,184 | A | 4/1998 | Kendall et al. |
| 5,770,232 | A | 6/1998 | Sizer et al. |
| 5,787,719 | A | 8/1998 | Wilson |
| 5,865,293 | A | 2/1999 | Napadow |
| 5,939,974 | A | 8/1999 | Heagle et al. |
| 6,019,033 | A | 2/2000 | Wilson et al. |
| 6,039,984 | A | 3/2000 | Bowling et al. |
| 6,086,833 | A | 7/2000 | Conners et al. |
| 6,089,036 | A | 7/2000 | Carlson et al. |
| 6,162,294 | A | 12/2000 | Davis et al. |
| 6,212,895 | B1 | 4/2001 | Richardson |
| 6,264,889 | B1 | 7/2001 | Tottenham et al. |
| 6,291,003 | B1 | 9/2001 | Riemann et al. |
| 6,365,169 | B1 | 4/2002 | Rosenblatt |
| 6,418,748 | B1 | 7/2002 | Kramer |
| 6,475,435 | B1 | 11/2002 | Taggart |
| 6,506,803 | B1 | 1/2003 | Baker, Jr. et al. |
| 6,551,182 | B2 | 4/2003 | Caracciolo, Jr. |
| 6,565,904 | B2 | 5/2003 | Roth |
| 6,576,915 | B1 | 6/2003 | McIntyre |
| 6,587,575 | B1 | 7/2003 | Windham et al. |
| 6,589,480 | B1 | 7/2003 | Yuan et al. |
| 6,607,435 | B2 | 8/2003 | Yokoyama et al. |
| 6,733,379 | B2 | 5/2004 | Tsang |
| 6,866,832 | B2 | 3/2005 | Garwood |
| 6,964,788 | B2 | 11/2005 | Phebus et al. |
| 7,077,967 | B2 | 7/2006 | Perkins et al. |
| 7,189,157 | B2 | 3/2007 | Wichelmann |
| 7,264,774 | B1 | 9/2007 | Howard |
| 7,269,925 | B2 | 9/2007 | Lam |
| 7,707,931 | B2 | 5/2010 | Garrett et al. |
| 7,717,773 | B2 | 5/2010 | Woodford et al. |
| 2003/0047087 | A1 | 3/2003 | Phebus et al. |

FOREIGN PATENT DOCUMENTS

| | | |
|---|---|---|
| DE | 31 10316 C2 | 4/1982 |
| DE | 201 08 320 U1 | 9/2002 |
| EP | 0 406 980 A1 | 1/1991 |
| EP | 0 584 955 A2 | 3/1994 |

OTHER PUBLICATIONS

Rourke, Tom Ph.D., Emmpak Foods, Inc., Clean Room Design and Sanitation, PowerPoint Presentation.

Tompkins, R. Bruce, Scott, Virginia N., Bernard, Dane T., Sveum, William H., and Gombas, Kathy Sullivan, Guidelines to Prevent Post-Processing Contamination from *Listeria*.

*Monocytogenese*, Dairy, Food and Environmental Sanitation, Aug. 1999, pp. 551-562.

Michael, M.E., Keeton, J.T., and Acuff, G.R., Pathogen Survival in Precooked Beef Products and Determination of Critical Control Points in Proceessing, Journal of Food Protection, vol. 54, No. 10, Oct. 1991, pp. 767-772.

Petrak, Lynn, Special Report, Cleanliness Rules, Plant Design & Construction Building Materials, The National Provisioner, Jun. 2002, pp. 94-96.

Petrak, Lynn, Special Report, Blueprint for Success, Plant Design & Construction A&E Firms, The National Provisioner, Jun. 2002, pp. 88-92.

Frank, Paula, Product Development, Protect and Defense, The National Provisioner, Dec. 2001, pp. 34-38.

Oakley, John, Hygiene Auditing for Food Safety, Hygiene & Quality Control, Food Processing, Oct. 1994.

Micro-Organisms in Foods 4, Application of the Hazard Analysis Critical Control Point (HACCP) System to Ensure Microbiological Safety and Quality/the International Commission on Microbiological Specifications for Foods (ICMSF) of the Internationa Union, Blackwell Scientific Publication.

Chilled Foods, A Comprehensive Guide, Second Edition, Woodhead Publishing in Food Science and Technology.

Galosich, Allison, Emmpak Foods, Inc., Safety Zone, National Provisioner, Nov. 1999, pp. 28-34.

National Beef Packing Company, www.nationalbeef.com/biologic.aspx.

K-State Research and Extension, An Informal Report to the Kansas Legislature, Know for Life, Jan. 2003, Kansas State University Agricultural Experiment Station.

All Business D&B, New Iowa Plant Construction Set, www.allbusiness.com/retail-trade/eating-drinking-places/4176572-1.html.

The Mother of Reinvention, Mar. 22, 2003.

Higgins, Kevin T., How Emmpak Manages HACCP, Mar. 22, 2003.

Salvage, Bryan, Food Safety, Safe and Sanitary, The National Provisioner, Jan. 2003, pp. 86-91.

Dolan, Thomas G., Food Safety, Plant Floor Sanitation, The National Provisioner, May 2002, pp. 110-114.

Darrah, R.M., A Quality Control Program for the Food Industry, J. Milk, Food Technology, vol. 37, No. 1 (1974).

The Dairy Practices Council, Guidelines for Clean Room Technology, Jan. 1994, Plant Equipment & Procedures Task Force.

Interim Guidelines, Microbial Control During Production of Ready-to-Eat Meet and Poultry Products, Controlling the Incidence of Microbial Pathogens, Feb. 1999.

*West Liberty Foods, L.L.C.* v. *Perdue Farms, Inc.*, Case No. 4:10-cv-00264, Complaint, Jun. 10, 2010.

*West Liberty Foods, L.L.C.* v. *Perdue Farms, Inc.*, Case No. 4:10-cv-00264, Defendant Perdue Farms, Inc.'s Answer and Counterclaim, Sep. 7, 2010.

*West Liberty Foods, L.L.C.* v. *Perdue Farms, Inc.*, Case No. 4:10-cv-00264, Answer to Counterclaim, Sep. 24, 2010.

*West Liberty Foods, L.L.C.* v. *Perdue Farms, Inc.*, Case No. 4:10-cv-00264, Defendant Perdue Farms, Inc.'s Answers to Plaintiff's First Set of Interrogatories.

*West Liberty Foods, L.L.C.* v. *Perdue Farms, Inc.*, Case No. 4:10-cv-00264, Defendant Perdue Farms, Inc.'s First Supplemental Answers to Plaintiff's First Set of Interrogatories.

*West Liberty Foods, L.L.C.* v. *Perdue Farms, Inc.*, Case No. 4:10-cv-00264, Defendant Perdue Farms, Inc.'s Second Supplemental Answers to Plaintiff's First Set of Interrogatories.

*West Liberty Foods, L.L.C.* v. *Perdue Farms, Inc.*, Case No. 4:10-cv-00264, Defendant Perdue Farms, Inc.'s Fourth Supplemental Answers to Plaintiffs First Set of Interrogatories.

*West Liberty Foods, L.L.C.* v. *Perdue Farms, Inc.*, Case No. 4:10-cv-00264, Perdue Supplemental Answer to West Liberty Foods LLC Interrogatories Nos. 12 & 13.

*West Liberty Foods, L.L.C.* v. *Perdue Farms, Inc.*, Case No. 4:10-cv-00264, Expert Report of Joseph Stout with exhibits, dated Sep. 22, 2011.

*West Liberty Foods, L.L.C.* v. *Perdue Farms, Inc.*, Case No. 4:10-cv-00264, Expert Report of Dr. John Holah with exhibits, dated Sep. 20, 2011.

Langman, Brent, Food Safety, Keep it Clean and Safe, The National Provisioner, Jan. 2002, pp. 74-77.

CLEAN ROOM FOOD PROCESSING METHODS

PRIORITY

This application is a divisional application of U.S. application Ser. No. 10/818,944 filed Apr. 6, 2004 now U.S. Pat. No. 7,707,931, which is incorporated herein by reference in its entirety.

BACKGROUND OF THE INVENTION

1. Field of the Invention

This invention is directed to systems, methods and structures for reducing the likelihood of contamination of processed foods by bacteria, other microorganisms, or other pathogens.

2. Related Art

As food quality, sanitation and refrigeration practices have become better, the presence in processed foods of most common bacteria that affect food safety has been substantially reduced. While this has improved food safety overall, it presents the opportunity for more marginalized, less common bacteria and other food pathogens, which are otherwise unable to compete with such more common bacteria, to proliferate and colonize food product(s) as they are processed. For example, *Listeria monocytogenes* (hereafter "LM" or "*Listeria*"), which is inhibited by competition from more common bacteria, and thus naturally prevented from reaching fatal concentrations, is sometimes able to colonize food product(s) as they are being processed. Because *Listeria*, unlike more common bacteria and other food pathogens, is able to grow well in refrigerated conditions, and because most, if not all, competing bacteria have been eliminated from the food product(s) being processed, there is little or no competition to the *Listeria* bacteria to keep it from growing to fatal concentrations when *Listeria* contaminates food.

At the same time, the U.S. government has instituted numerous programs and testing regimes to ensure that food products are pathogen-free, i.e., are not adulterated. For example, the presence of a food pathogen on a ready-to-eat meat product renders the meat product adulterated under the provisions of the Meat Inspection Act and/or the Poultry Inspection Act. If adulterated, the ready-to-eat meat product cannot be shipped. Additionally, if the ready-to-eat meat product has already been shipped, it must be recalled. Moreover, in most, if not all, conventional food processing facilities, even if the source of adulteration of a particular lot of food product can be traced to a single processing element, such as a food slicer, in that food processing facility, it is difficult, if not impossible, to determine which particular food items may have come in contact with that source of adulteration. As a result, the typical recall involves all products passing through a food processing facility during the time of potential adulteration to ensure that no adulterated food product remains available for sale to the ultimate consumer.

The U.S. Department of Agriculture (USDA) has determined, for example, that *Listeria* is a hazard reasonably likely to occur in a slicing operation. Slicing operations are relatively high risk because pathogenic *Listeria monocytogenes* is ubiquitous and grows at refrigerated temperatures. Thus, because *Listeria* is ubiquitous, it is very difficult to prevent *Listeria* from colonizing processed food product(s) at points between an upstream lethality treatment and a downstream packaging operation, such as at a slicing operation. Furthermore, because sliced meats are "ready-to-eat", they are typically removed from packaging and consumed without any consumer-applied lethality treatment, such as cooking.

SUMMARY OF THE DISCLOSURE

Bacteria and other food pathogens that are not well controlled by the current regimes of lethality treatment followed by refrigeration, such as *Listeria*, provide significant challenges in preparing and packaging processed food product(s) so they do not become adulterated. For example, common industry practice is to have multiple food processing devices, such as slicers, and multiple downstream packaging machines in the single food processing room of the food processing facility. However, this provides a chance for contamination by bacteria or other food pathogens spreading from machine to machine by migration across wet floors, through the air for microorganisms, such as *Listeria*, that are able to aerosol and float around on water droplets in the air, by food processing and supervisory personnel moving from one machine to another in the single processing room, by food processing personnel moving freely from one food processing room to another, and/or by maintenance personnel working on multiple similar and dissimilar machines within a single food processing area or freely moving between separate food processing areas.

This invention provides food processing facilities, systems and methods that reduce the ability of bacteria and other food pathogens to spread from outside of the facilities into and through the facilities to contaminate food processing machinery and food being processed within the facility.

This invention separately provides food processing facilities, systems and methods which place one or more food processing machines and one or more associated packaging machines forming a single set of food processing devices in a separate food processing room.

This invention separately provides food processing facilities, systems and methods that reduce the ability of food pathogens to migrate from a contaminated location or machine and/or from outside of the facility to an uncontaminated location or machine by controlling the movement of persons between unsecure, semi-secure and secure portions of the food processing facility.

This invention separately provides food processing facilities, systems and methods that reduce the ability of food pathogens to migrate from a contaminated location or machine and/or from outside of the facility to an uncontaminated location or machine by limiting food processing personnel to working in a single food processing rooms containing a single set of food processing devices.

This invention separately provides food processing facilities, systems and methods that reduce the ability of contamination to migrate from an adulterated location or machine and/or from outside of the facility to an unadulterated location or machine by limiting the movement of food processing personnel between food processing rooms containing a single set of food processing devices.

This invention separately provides food processing facilities, systems and methods that reduce the ability of contamination to migrate from an adulterated location or machine and/or from outside of the facility to an unadulterated location or machine by controlling the movement of maintenance personnel between food processing rooms.

This invention separately provides food processing facilities, systems and methods that reduce the ability of contamination to migrate from an adulterated location or machine and/or from outside of the facility to an unadulterated location or machine by separately providing at least commonly-used maintenance materials in each separate food processing room.

This invention separately provides food processing facilities, systems and methods that reduce the ability of contamination to migrate from an adulterated location or machine and/or from outside of the facility to an unadulterated location or machine by placing each set of one or more food processing devices and one or more associated packaging devices in a separate high-pressure area such that air flows from the high-pressure areas into areas adjacent to the high pressure areas.

This invention separately provides food processing facilities, systems and methods that reduce the ability of contamination to migrate from an adulterated location or machine and/or from outside of the facility to an unadulterated location or machine by providing separate food processing rooms, each having separate, dedicated ventilating and/or air conditioning (VAC) systems.

This invention separately provides food processing facilities, systems and methods that reduce the ability of contamination to migrate from an adulterated location or machine and/or from outside of the facility to an unadulterated location or machine by drawing all initial and make-up air supplied to a particular VAC system from outside the food processing facility containing the individual food processing rooms.

This invention separately provides food processing facilities, systems and methods that use a first conveyor system to convey unpackaged lethality-treated food product(s) into a food processing room to be further processed in that room and a separate packaged food output conveyor system that conveys food product packaged in that food processing room to a downstream handling system.

This invention separately provides food processing facilities, systems and methods that provide higher air pressure regions in the food processing rooms and lower air pressure regions around input and output conveyor systems such that air flows from the food processing room into the conveyor areas.

This invention separately provides food processing facilities, systems and methods where each food processing room has a sloped floor leading to a dedicated floor drain and line that continues uninterruptedly from the food processing room to a point where the drain line can be plugged independently of any of the other drain lines.

This invention separately provides food processing facilities, systems and methods for plugging the drain and filling the drain line and the lower portions of the associated food processing room with a disinfectant or the like which sanitizes the plugged portion of the drain, the room floor and the lower portions of the structures in the food processing room.

This invention separately provides food processing facilities, systems and methods in which air is circulated into the food processing rooms at a sufficiently high velocity to dry and maintain dry the floor and any equipment services within a particular food processing room between sanitizing cleaning procedures.

This invention separately provides food processing facilities, systems and methods where the joints between walls, walls and ceiling, and/or walls and floor are specially designed and treated to inhibit movement of water or moisture between individual floor, ceiling or wall panels, and into or between separate food processing rooms.

This invention separately provides food processing facilities, systems and methods that use special floor-wall joint structures to inhibit moisture transfer between food processing rooms and between food processing rooms and food delivery areas, food boxing areas, and other food processing areas and from occurring beneath the walls dividing each separate food processing room from other food processing rooms and from common areas.

This invention separately provides food processing facilities, systems and methods that include footwear sanitizing stations within the food processing facility at interfaces between different food processing and/or common areas.

This invention separately provides food processing facilities, systems and methods for receiving food product(s) to be processed in the food processing facility and for sanitizing the exterior surfaces of the food product(s) to be processed at the food processing facility before delivering the food product(s) to be processed to the separate food processing rooms.

In various exemplary embodiments of food processing facilities, methods and systems according to this invention, any persons entering secure and semi-secure areas of the food processing facility must wear specialized footwear, which must be sanitized upon entering and exiting semi-secure and secure areas of the food processing facility. Persons moving between various ones of the semi-secure and secure areas of the food processing facility must also pass through footwear sanitizers as they move between the different sub-portions of the food processing facility. Employees entering a secure area, where the food product is exposed, must wear a clean "secure area" uniform. All other persons entering the semi-secure areas of the food processing facility must wear designated clothing and are prevented from entering the secure areas of the food processing facility. In various exemplary embodiments, upon a person exiting the secure areas to a semi-secure or unsecure area, the current secure area uniform worn by that person must be discarded and a new sanitized secure area uniform must be worn and footwear appropriately sanitized before re-entering any secure area. Any equipment, such as tools, that are to be taken into one of the food processing rooms is desirably flushed with alcohol or otherwise sterilized before that equipment can be taken into that food processing room.

In various exemplary embodiments of food processing facilities, systems and methods according to this invention, food product(s) to be processed entering even the semi-secure areas of the food processing facility must be pre-cooked and/or must have been otherwise subjected to appropriate protective and lethality treatments to ensure that the food product(s) are essentially free of adulterating pathogens when they enter the food processing facility. In various exemplary embodiments, the food product(s) must be received in casings, other sealing material or the like, which are also essentially free of adulterating pathogens. After being received at the food processing facility, and before any processing of the received food product(s), the casing, sealing material or the like are sanitized and the food product(s) are next removed from the casing, sealing material or the like and one or more further lethality treatments are applied to kill any pathogens that might somehow have reached the surface of the food product(s).

After the one or more lethality treatments, the received food product(s) are transported, for example, by conveyor through a food produce delivery area, to each of the separate food processing rooms for further food processing. In general, the food product(s) delivery areas through which the food product(s) pass between the final lethality treatments and the food processing rooms are also treated as secure or sterile regions such that any source of contamination is excluded from such regions. In various exemplary embodiments, the food product(s) pass from the delivery area, which is at a first pressure, through a delivery opening into a particular food processing room, which is maintained at a higher air pressure, such that air moves unidirectionally through the delivery opening in the direction opposite that of the food product(s) as they enter that food processing room.

In various exemplary embodiments of food processing facilities, systems and methods according to this invention, once in a given food processing room, the food product(s) is processed and immediately packaged for transport out of the food processing facility while in that food processing room. The packaged food product(s) is then transported, for example, by conveyor, out of the higher air pressure food processing room into a second common area. Because the food processing room is also at a higher pressure than this second common area, air constantly moves unidirectionally through the exit opening in the direction of movement of the packaged food product(s). The packaged food product(s) from the various food processing rooms are then inspected for package integrity, further packaged, held under refrigerated conditions and prepared for transport to a customer for sale to the ultimate consumer. Any inspected package which lacks integrity is rerouted for another lethality treatment before repackaging in the food processing room from which it came.

In various exemplary embodiments of food processing facilities, systems and methods according to this invention, should one of the isolated food processing rooms become contaminated, that room can be shut down and sterilized without affecting the operation of other food processing rooms. Furthermore, because all of the food product processed in that food processing room were separately packaged and identified while in that food processing room, the food product from that food processing room is inherently distinguishable from the food products processed in the other food processing rooms, and thus can be separately recalled or otherwise destroyed. If contaminated, that food processing room can then be sterilized using a combination of one or both of heat and chemical sanitizers. In addition, the drain for that room can be separately plugged and flushed for sanitizing reasons without affecting the operation of the drain lines of the other food processing rooms.

In various exemplary embodiments of food processing facilities, systems and methods according to this invention, when repair or maintenance of the machinery in a given food processing room is required, maintenance personnel entering that food processing room must also be wearing secure area uniforms and go through the same sanitary procedures as the operators working in that food processing room. In various exemplary embodiments, if the maintenance personnel are coming from another food processing room, those maintenance personnel desirably don new, sanitary food processing uniforms.

In various exemplary embodiments of food processing facilities, systems and methods according to this invention, each of the food processing rooms contains all of the supplies and tools necessary to perform common maintenance procedures and to repair the food processing equipment due to common or expected faults. Accordingly, for simple or common repairs or maintenance, the maintenance personnel do not need to carry any tools or supplies into that food processing room. If more unusual repairs or maintenance needs to be made, any parts, supplies or tools that must be carried into that food processing room by the maintenance personnel are desirably first subjected to an alcohol wash or other appropriate cleaning and/or sterilizing procedure before those parts, supplies and/or tools are carried by the maintenance personnel into that food processing room.

These and other individual features and advantages which may be separately incorporated in various exemplary embodiments of systems and methods according to this invention are described in, or are apparent from, the following detailed description of various exemplary embodiments of the systems, methods and facilities for processing food according to this invention.

BRIEF DESCRIPTION OF DRAWINGS

Various exemplary embodiments of the systems, methods and food processing facilities of this invention will be described in detail, with reference to the following figures, wherein.

DETAILED DESCRIPTION OF DISCLOSED EMBODIMENTS

Figure 1:
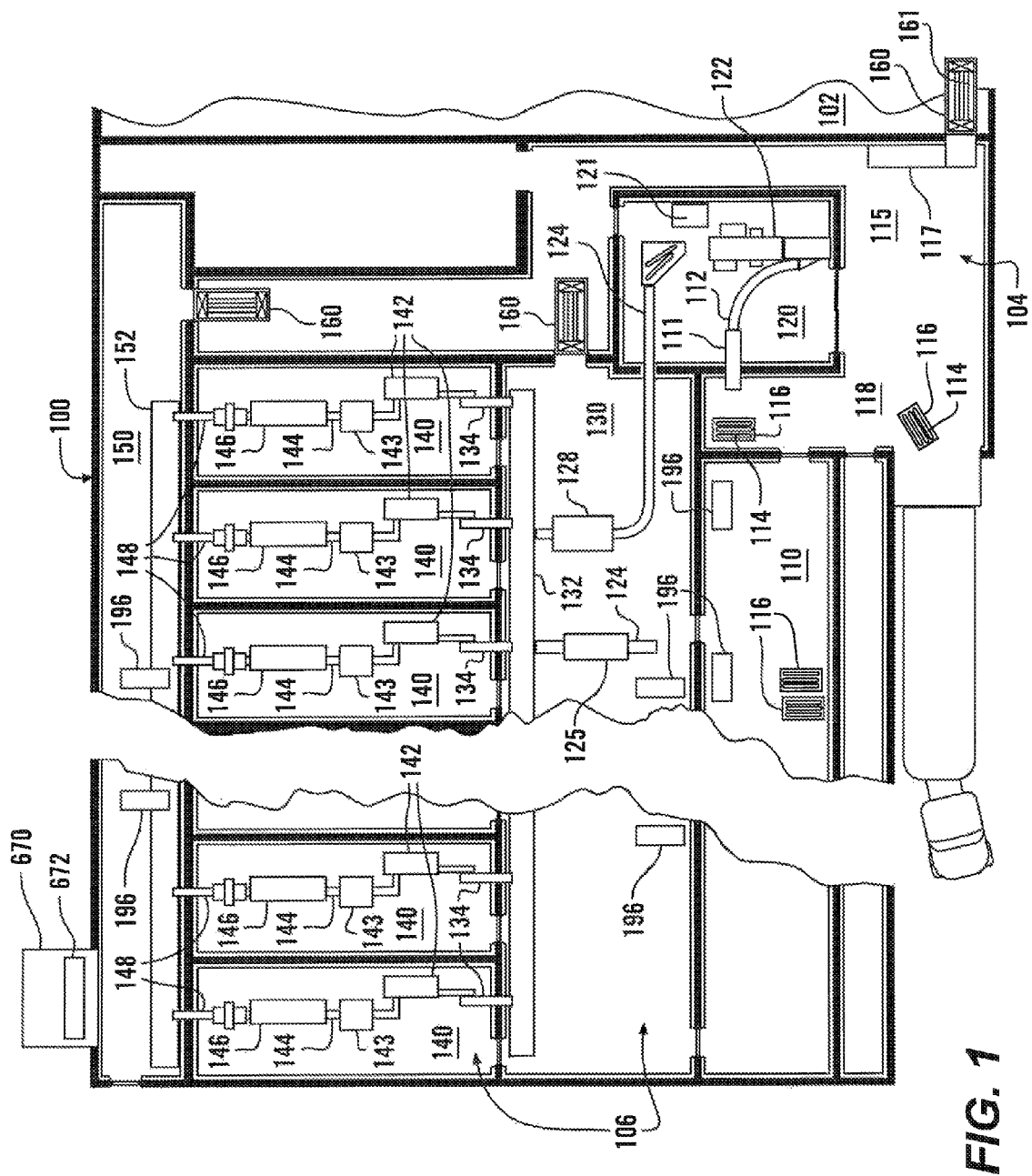
FIG. 1 is a schematic top plan view of a first exemplary embodiment of a food processing facility and food processing systems according to this invention.

As developed countries, such as the United States, consume ever larger percentages of processed food products, the safety of such processed food products has become of paramount importance. As a result, various governmental agencies in such developed countries have promulgated various rules and regulations which have improved food quality and safety and have substantially eliminated contamination or adulteration of such processed food products by most common food-born pathogens.

However, this has opened up the possibility of contamination or adulteration by more marginalized food pathogens. That is, the most common food pathogens are those that grow most readily and rapidly on food products at room temperatures in standard environments, and can be controlled or lethally treated by refrigeration and heat treatment. However, in the absence of such pathogens controlled or eliminated by conventional refrigeration and heat treatment, other pathogens have shown the ability to grow and prosper under refrigerated conditions.

For example, *Listeria monocytogenes* ("LM" or "*Listeria*") is one such bacteria that is better able to tolerate colder temperatures than more common bacterial species. As a result, *Listeria* is able to successfully colonize and multiply at refrigeration temperatures that control the growth of more common bacteria. In fact, *Listeria* colonies can grow to concentrations in refrigerated processed food products that can cause fatal side affects in humans when such processed food products are consumed. As a result, current food safety standards generally require that contamination or adulteration of processed food products by *Listeria* be, ideally, completely avoided.

The following detailed description of various exemplary embodiments of food processing facilities, systems and methods according to this invention are described relative to controlling the risk of *Listeria monocytogenes* adulteration of processed meat products. However, it should be appreciated that the food processing facilities, systems and methods illustrated by the exemplary embodiments described herein are equally applicable to other types of processed food products, such as dairy products, fruit and vegetable products, and the like. Moreover, it is likely that other bacteria and other pathogenic microorganisms, in addition to *Listeria*, such as *Salmonella*, are or will become of concern in the future. It should be appreciated that the food processing facilities, systems and methods according to this invention illustrated by the following exemplary embodiments are equally useful in reducing the ability of other pathogenic microorganisms to adulterate processed food products, such as meat products, dairy products, fruit and/or vegetable products, or the like. However, for ease of understanding and simplicity of discussion, the following detailed descriptions will disclose food processing facilities, systems and methods for reducing contamination or adulteration of processed meat products with particular reference to *Listeria*.

FIG. 1 is a schematic top plan view of a first exemplary embodiment of a food processing facility 100 according to this invention that employs "single-line" food processing rooms and clean room-like procedures to both reduce the ability of *Listeria monocytogenes* or other pathogens to initially contaminate a single-line food processing room or other area of the food processing facility 100 from outside of the food processing facility 100, and, if a single-line food processing room or other area of the food processing facility 100 should become contaminated, reduce the likelihood that the contamination will spread to other single-line food processing rooms or other areas of the food processing facility 100. In particular, the food processing facility 100 shown in FIG. 1 is a meat and cheese slicing facility. However, it should be appreciated that various ones of the different structures of the food processing facility 100 described herein can be applied to food processing plants designed for processing other types of food products and other types of food processing operations.

As shown in FIG. 1, previously-processed meat products are received at a food receiving area 118 of the food processing facility 100 and stored in a food product storage cooler 110 until such time as a particular portion of the received food product is ready for further processing in the food processing facility 100. It should be appreciated that, in various exemplary embodiments, to reduce the likelihood that the food product to be processed in the food processing facility is not contaminated when it is received at the food processing facility 100, only previously processed food products, such as previously cooked meat products, are received and processed by the food processing facility 100. In various exemplary embodiments, to reduce this risk as much as possible, any raw or untreated food products are denied entry into the food processing facility 100. In various exemplary embodiments, the received processed meat product is a relatively long tubular cooked meat product which will be subsequently sliced at the food processing facility 100. Such long tubular cooked meat products are commonly referred to as "logs". In various exemplary embodiments, these logs 114 have been encased in a sealed plastic casing after cooking and prior to arrival at the facility 100.

In various exemplary embodiments according to this invention, the received food products, such as the encased logs, as received, are stored in specialized stainless steel containers, racks, or any other appropriate device that can be used to transfer the received food product to the food processing facility. The containers 116 allow different lots of the processed meat product or other received food product to be kept separately from other lots to avoid cross-contamination while the received food products are being transported and/or while the received food products are awaiting further processing. In various exemplary embodiments, the received ready-to-eat food products to be processed in the food processing facility 100 are transported to the food processing facility 100 on a "just-in-time" schedule. However, even in this case, it is often necessary to temporarily store the containers 116 in the storage cooler 110. By using the containers 116, only limited amounts of the processed food product need to be exposed when removing the logs 114 from the containers 116 for transport into the secure areas of the food processing facility 100. It should be understood that, in various exemplary embodiments, conventional enclosures (not shown) are used between the trailer of the delivery truck and the doorway to the food receiving area 118 of the food processing facility 100 to minimize the possibility of contamination of the food product while moving the containers 116 from the trailer to the food receiving area 118 of the food processing facility 100.

The food receiving area 118 where the containers 116 of received food product enter the food processing facility 100 and the storage cooler 110 are two portions of a semi-secure region 104, which also includes a buffer zone 115, that lies between generally unsecured areas where little or no effort is made to ensure that food pathogens are not present, and secure areas of the food processing facility 100, where extensive efforts are made to prevent food pathogens from entering such areas and to inhibit the spread of food pathogens should any be present in the secure areas. It should be appreciated that the terms "secure" and "semi-secure" refer to the efforts to exclude food pathogens and other microorganisms, and not to efforts directed to preventing theft, unauthorized access, terrorism or the like.

In various exemplary embodiments, when a food log 114 (or any other processed food product) is to be removed from the storage cooler 110 for further processing, the container 116 containing that log 114 is typically removed from the storage cooler 110 and placed adjacent to a conveyor 112. The log 114 is removed from its container 116 and placed onto the conveyor 112, which conveys the log 114 into a treatment room 120. The treatment room 120 is used to reduce the presence of, and ideally completely remove, any bacteria or other pathogenic microorganisms, which may have opportunistically colonized the processed food products, before the processed food product is transported into the food processing facility 100.

For example, for processed ready-to-eat meat logs 114, as previously indicated, the meat logs 114 are typically sealed in plastic casings when received from the upstream food processing facility that formed the processed meat logs 114. In various exemplary embodiments, the plastic-encased meat logs 114 are transported in the containers 116 from the storage cooler 110, removed from the containers 116 and placed onto the conveyor 112, which conveys the logs 114 through a sanitizing washer 111 to remove any pathogens which may be present on the exterior of the casing, and into the treatment room 120, where the cleansed plastic casing is removed from around the processed meat log 114 and discarded. The exterior surface of the processed meat log 114 is then subjected to a post-lethality treatment to reduce, and ideally eliminate, any bacteria or other pathogenic microorganisms that may have colonized the surface of the processed meat log 114.

In various exemplary embodiments, the term "post-lethality treatment" means a treatment that is applied to the processed meat log 114 (or other food product to be processed in the food processing facility 100) after it was subjected to cooking or another upstream lethality treatment at the upstream food processing facility before being packaged for transport to the food processing facility 100. In various exemplary embodiments of the food processing facility 100, the post-lethality treatment applied in the treatment room 120 comprises running the meat log through a treatment device 122 and/or an infrared tunnel 125 (shown in the area 130) that heats the entire surface of the processed meat log 114 to a sufficiently high temperature that any pathogenic bacteria or other microorganisms which may be present on the surface of the meat log 114 are expected to be killed. The treatment device 122 can be a hot liquid bath, such as a hot oil bath or hot water bath, or a steam treatment device, or another appropriate device that obtains a product surface temperature that results in a 2 log reduction in the pathogen. In another exemplary embodiment, the meat log may be run through a conventional chemical sanitizer (not shown) employing, for example, a sanitizing solution comprising chlorine or peracedic acid. The treated meat log 114 (or other processed food product) is then transported on a conveyor 124 from the treatment device 122 and/or 125 that is within the treatment room 120 into a delivery area 130. In various exemplary embodiments, the conveyor 124 may deliver the treated meat log 114 to a cruster 128, such as a Vertical Rapid Cruster manufactured by Unitherm Food Systems of Bristow, Okla., which creates a uniform frozen crust in the surface of the meat log 114 to improve the sliceability of the meat log 114. From the cruster 128, the conveyor 124 delivers the crusted meat log 114 to a distribution conveyor 132 located in the delivery area 130. The distribution conveyor 132 is used to convey a particular meat log 114 or other treated food product to a desired one of a plurality of single-line food processing rooms 140.

It should be appreciated that, in various exemplary embodiments, the treatment room 120 is another portion of the semi-secure region 104. In such exemplary embodiments, while the food product is unsealed and exposed in the treatment room 120, because of the treatment applied in the treatment room 120, the treatment room 120 does not need to be part of the secure area 106. However, if desired, the treatment room 120 can be made part of the secure area 106. It should also be appreciated that, in various exemplary embodiments, the treatment room 120 is equipped with an exhaust system 121 for maintaining a slightly negative atmospheric pressure in the treatment room 120. Thus, air will be pulled out of the delivery area 130 into the treatment room 120, and then, together with any fumes from the fryer 122, is exhausted out of the facility 100 to the outdoors by the exhaust system.

Alternatively, one or more infrared tunnels 125 may be located in the delivery area 130, as shown in FIG. 1. Accordingly, in various other exemplary embodiments, while a lethality treatment is applied to a particular log 114 or other processed food product, that log 114 or other processed food product does not go through the treatment room 120. In this case, a dedicated lethality treatment or device may be provided for one or more sets of one or more such food processing rooms 140 that process such a log or other processed food product. For example, if the treatment applied in the treatment room 120 is applied using a heated oil bath, but the customer does not want the processed food product to go through such a process, or the food product cannot withstand such a treatment, that food product will skip the treatment room 120. In this case, the food product can be removed from its container 116 and the outside of the casing sanitized. The sanitized food product is then delivered to the delivery area 130, the casing removed, and the uncased food product 114 transported to the appropriate food processing room 140. At some point between having the casing removed and being transported into the appropriate food processing room 140, the lethality treatment, such as passing through an infrared tunnel 125 shown in FIG. 1, or the like, is applied to the uncased food product 114 while in the delivery area.

The various single-line food processing rooms 140 are the only locations within the food processing facility 100 where the food product to be processed, such as the meat logs 114, is actually processed, other than receiving lethality treatments, such as those described above. It should be appreciated that only a single line of food processing devices may be provided in each of the various "single-line" food processing rooms 140. This remains the case even if the single line of food processing devices in a given food processing room 140 is divided into two separate food processing paths or sets, as there is a single food product inlet from the food delivery 130 to a single-line food processing room 140 and a single outlet from a single-line food processing room 140 to a packaged food receiving area 150. The food processing devices in that single-line food processing room 140 are independent of the food processing devices in any other single-line food processing room. In any case, the product packaged in any such single-line food processing room 140 will receive an unique identity code, printed on the package, which will enable the operators to trace every package produced in the food processing facility 100 back to the individual food processing room 140 in which it was processed and packaged.

In various exemplary embodiments, each set or line of devices in a single-line food processing room 140 includes two or more serially-connected food processing elements. For example, in various exemplary embodiments of the food processing facility 100, each of the single-line food processing rooms 140 is a slicing room where the meat logs 114 are converted into sliced meat product. In some exemplary embodiments of such slicing rooms, the output of an upstream food processing device is directed to a single downstream food processing device and only one such line is present in any given single-line food processing room 140. For slicing operations, a single-line food processing room 140 will typically include a slicing machine 142 and a packaging machine 146.

It should also be appreciated that, in various exemplary embodiments according to this invention, any food product leaving a single-line food processing room 140 will be packaged before it leaves that single-line food processing room 140. It should be appreciated that "packaged" generally encompasses providing a sealed barrier between the processed food product and its ambient environment, such that any pathogens in the ambient environments that the processed food product experiences after leaving the single-line food processing room 140 and until the opening of the package, either by the end consumer or within another downstream food processing facility, are unable to penetrate the barrier and contaminate or adulterate the processed food product.

As shown in FIG. 1, a transfer conveyor 134 receives the meat logs 114 or other processed food product from the distribution conveyor 132 and conveys the meat logs 114 or other processed food product from the delivery area 130, through a passage or opening in a wall separating that single-line food processing room 140 from the delivery area 130, and into the interior of the single-line food processing room 140. It should be appreciated that the processed food product can go directly from the treatment room 120 to one of the single-line food processing rooms 140. In various other exemplary embodiments, the treated food product is chilled, for example, by using the cruster 128 described above, before being delivered to the single-line food processing room 140. Using the cruster 128 both reduces the surface temperature of the log 114, and arrests any bacterial activity that could otherwise occur on the surface of that log 114 after passing through the oil bath or infrared tunnel, and also beneficially makes the log 114 easier to slice. The chilled log 114 or other food product is then transported to the appropriate food processing room 140 as described above.

It should be appreciated that, in various exemplary embodiments, the passage or opening for the conveyor 134 through the wall separating the single-line food processing room 140 from the delivery area 130 is desirably sized on the order of the meat log 114 or other processed food product being conveyed by the transfer conveyor 134. It should also be appreciated that the single-line food processing room 140 is desirably kept at a higher internal pressure and a colder temperature than the pressure and temperature within the delivery area 130. As a result, there is a positive or increasing pressure gradient along the direction of travel of the transfer conveyor 134 such that there is an unidirectional air flow out of the single-line food processing room 140 into the delivery area 130. This ensures that any pathogens which may be present in the atmosphere in the delivery area 130, however unlikely, cannot travel by aerosol action or air flow from the delivery area 130 into a particular single-line food processing room 140.

Once in a given single-line food processing room 140, each meat log 114 or other processed food product received from the delivery area 130 passes generally (i.e., more or less) serially through the various food processing and/or packaging machines that form the single food processing line contained within that single-line food processing room 140. As shown in FIG. 1, the meat log 114 or other processed food product transported by the transfer conveyor 134 travels to a feeder station 142, where the meat log 114 or other processed food product is fed to a slicing machine 143 and sliced into a plurality of separate slices of a desired thickness. A number of slices are gathered into a portion and the plurality of slices of the sliced food product forming a portion are then conveyed together by a second transfer conveyor 144 to, and packaged by, a packaging machine 146. In various exemplary embodiments, the sliced meat or other processed food product is packaged into thermoformed plastic cavities, which are then flushed with a gas as a plastic sheet is heat sealed to the cavity rim to form a hermetic or other impervious seal. In contrast, in various other exemplary embodiments, the sliced meat or other processed food product portion is vacuum packaged and sealed while in the single-line food processing room 140.

It should be appreciated that, in various other exemplary embodiments, different types of food processing equipment will be contained within the single-line food processing room 140. In some exemplary embodiments, regardless of the types and numbers of food processing devices contained within the single-line food processing room 140, the various food processing devices will be organized such that a single line or series of food processing devices, through which all of the received meat logs 114 or other processed food products pass, is formed. That is, in such exemplary embodiments, the various food processing devices contained within the single-line food processing room 140 are not organized into two separate, effectively parallel lines or the like. By having only a single line of series-connected food processing devices in each single-line food processing room 140, each single-line food processing room 140 becomes essentially a separate food processing facility.

Thus, if any one of the food processing devices in a single one of the single-line food processing rooms 140 becomes contaminated, only the processed food product which passed through that single-line food processing room 140 could be contaminated. Should a particular lot of processed food product which passed through that single-line food processing room 140 need to be recalled and/or destroyed before shipping, that processed food product lot can be dealt with in the knowledge that none of the other processed food products produced by the other single-line food processing rooms 140 in the food processing facility 100 need to be recalled the contamination present only within that first single-line food processing room 140. Likewise, should a particular device within the single-line food processing room 140 become contaminated, there will be a concern that all of the processed food product passing through that single-line food processing room 140 during the contamination period may have come into contact with that particular contaminated food processing device and thus, may need to be recalled and/or destroyed or otherwise rehabilitated.

However, it should be appreciated that, in less rigorous exemplary embodiments, a particular "single-line" food processing room 140 could contain more than one of a particular type of food processing equipment that is fed by a set of one or more input conveyor(s) and discharged to a set of one or more output conveyor(s). However, in this case, while the risk of cross-contamination between food processing lines in different food processing rooms 140 has been reduced, the ability of *Listeria* or other pathogenic microorganisms to cross contaminate parallel machines within a single-line food processing room 140 is not inhibited.

The packaged food product is then output from the packaging device 146 on to a third transfer conveyor 148. The third transfer conveyor 148 transports the packaged food product into the receiving area 150. In particular, the third transfer conveyor 148 passes through a passage or opening in a wall that separates the single-line food processing room 140 containing that transfer conveyor 148 from the receiving area 150. In various exemplary embodiments, the passage or opening is desirably sized on the order of the size of the packaged food product being transferred out of that single-line food processing room 140.

In various exemplary embodiments, as the packaged food product enters the receiving area 150 on the third conveyor 148, the packaged food product is inspected. If the inspection reveals that a particular packaged food product needs to be re-packaged, that packaged food product is placed on a return conveyor (not shown) that conveys that packaged food product back into the food processing room 140 that it came from. The returned packaged food product's package is sanitized before or as it enters that single-line food processing room 140. Once in that food processing room 140, the returned food product package is opened and disposed of and the returned food product is placed into a new package and resealed.

In contrast, in some exemplary embodiments, the third transfer conveyor 148 deposits the packaged processed food product from that single-line food processing room 140 onto a collection conveyor 152 that collects various processed and packaged food products from the various single-line food processing rooms 140. Once on the collection conveyor 152, the packaged processed food product can be inspected, boxed, collected and/or palletized for shipping to a finished product cooler, a warehouse, or the ultimate consumer.

It should also be appreciated that, like the delivery area 130, the receiving area 150 is at a lower atmospheric pressure and temperature than the single-line food processing rooms 140, although the receiving area 150 does not need to be at either the same pressure or the same temperature as the delivery area 130. As a result, there is a decreasing, or negative, pressure gradient along the direction of travel of the third transfer conveyor 148 as it passes through the opening in the wall separating the single-line food processing room 140 from the receiving area 150. As a result, there is a unidirectional air flow from the single-line food processing rooms 140 into the receiving area 150, effectively preventing the migration of any pathogens present in the receiving area 150 into the single-line food processing rooms 140 through the limited openings in the walls separating the single-line food processing rooms 140 from the receiving area 150. Likewise, there will be a similar unidirectional air flow from the single-line food processing rooms 140 to the receiving area 150 surrounding the return conveyors (not shown) and the packages being returned to the single-line food processing rooms 140 for repackaging.

To further reduce the ability of *Listeria* and other pathogenic microorganisms from migrating from place to place within the food processing facility 100, the food processing facility 100 is divided into the first region 102, the second region 104 and the third region 106. In general, the first region 102, which corresponds to the unsecured area, includes such facilities as locker rooms where the personnel employed in the food processing facility 100 can change their clothes, lunch and/or break rooms where the personnel can take their breaks and/or eat breakfast, lunch or dinner, restrooms, offices for the management personnel for the food processing facility 100 and the like. The first region 102 can also include conference and meeting rooms, visitor reception areas and the like. Because these areas are in the first region 102, rather than in the second region 104, it is likely that the personnel employed by the food processing facility 100 will make multiple trips between the first region 102 and the second or third regions 104 or 106 during the typical work shift. The second region 104, which corresponds to the semi-secure area, includes a clean uniform storage 117 in the buffer zone 115, the storage cooler 110, the food receiving area 118, the treatment room 120, and the packaged food receiving area 150. The third region 106, which corresponds to the secure areas, includes the delivery area 130 and the various single-line food processing rooms 140.

In general, movement within the first region 102 and access to the first region 102 from outside the food processing facility 100 by authorized personnel is generally not restricted. Accordingly, employees and other authorized personnel can freely enter the first region 102 from the second region 104 and from outside the food processing facility 100. Thus, the first region 102 can be referred to as an "unsecure area". In contrast, access to the various rooms and areas forming the second region 104 and movement between those regions and the first region 102 is strictly controlled. In particular, movement between the first region 102 and the second region 104 requires passing through a sanitizing station 160, such as the sanitizing station 161 located between the first area 102 and the buffer zone 115. In addition, in various exemplary embodiments, movement from the first region 102 into the second region 104 requires that special clothing or uniforms be donned prior to or immediately after passing through the sanitizing station 161. Similarly, moving from the second region 104 into the first region 102 requires passing through the sanitizing station 161 and removal of the special clothing or uniform.

In various exemplary embodiments, the required clothing includes rubber boots or other appropriate footwear that is generally impervious to liquids and from which *Listeria* and other pathogenic microorganisms can be relatively easily removed. In such exemplary embodiments, the sanitizing station 161 includes footwear scrubbing and/or sanitizing devices that use both mechanical devices and chemical applications to remove and/or kill any bacteria that may be present on the rubber boots. When personnel pass between the first and second regions 102 and 104, they are required to pass through the sanitizing station 161 to ensure that no *Listeria* or other pathogenic microorganisms that may be present on the employees' footwear survives the sanitizing station, such that such microorganisms are not transported between the first and second regions 102 and 104.

In various other embodiments, in addition to or instead of the rubber footwear, the specialized clothing can include head coverings, smocks and other over-clothing, and even can include specialized clean room-type sanitized suits or uniforms. Additionally, in various exemplary embodiments, personnel leaving the second region 104 and entering the first region 102, before or after passing through the sanitizing station 161, are required to remove the specialized clothing and recycle it for sanitizing.

Because reasonably strict procedures, including that cooked-only food product be stored and processed in the second region 104, the type of food processing not permitted in the second region 104, and the movement of food processing personnel between the first region 102 and the second region 104, are designed to reduce the likelihood that *Listeria* or other pathogenic microorganisms are able to enter or migrate into the region 104, the region 104 can be referred to as a semi-secure area. Additionally, in various exemplary embodiments, in addition to controlling how the food processing personnel move between the first region 102 and the second region 104, the types of personnel that are permitted to move between the first region 102 and the second region 104 can also be controlled. In various exemplary embodiments, access to the second region 104 can be limited to food processing personnel and visitors having designated certifications, such as having completed food safety specialist training and certification.

Once in the second region 104, access to the delivery area 130, the receiving area 150, and the single-line food processing rooms 140 can be further controlled by requiring food processing personnel to pass through further sanitizing stations 160 between the second region 104 and the delivery area 130, the packaged food receiving area 150 and the single-line food processing rooms 140. Thus, in such exemplary embodiments, the food processing personnel pass through additional sanitizing stations 160 to enter the delivery area 130, the single-line food processing rooms 140, or the receiving room 150 from the buffer zone 115, and when passing back into the buffer zone 115 from the single-line food processing rooms 140, the delivery area 130, or the packaged food receiving area 150.

In various exemplary embodiments, while access to the buffer zone 115 may be permitted, access to the third region 106, i.e., at least the delivery area 130 and the single-line food processing rooms 140, can be limited to food processing personnel having completed food safety specialist training and certification and having specific duties within such areas. Furthermore, in various exemplary embodiments, access to the single-line food processing rooms 140 is further limited only to operators of the machines forming the single-line food processing system in the single-line food processing room 140, to supervisors and quality control/assurance personnel, and to maintenance personnel who require entry into a particular single-line food processing room 140 in order to maintain and/or repair the equipment in that single-line food processing room 140. In various exemplary embodiments, any food processing personnel entering such a single-line food processing room 140 must wear a clean room-style protective suit or other appropriate full-body covering, in addition to the prescribed footwear. Similarly, in various exemplary embodiments, any food processing personnel entering the delivery area 130 are also required to wear such a clean room-style protective suit or other appropriate full-body covering. In various exemplary embodiments, if a food processing employee moves from the third region 106 back out into any portion of the second region 104, that person must remove the protective suit or other full body covering and don a new such protective suit or full-body covering before re-entering the third region 106.

Thus, the likelihood is reduced that any *Listeria* or other pathogenic microorganisms that have been able to migrate into the second or third regions 104 or 106 will be able to migrate further into the third region 106, i.e., into the delivery area 130, or even further into the single-line food processing rooms 140. Likewise, the likelihood that any *Listeria* or other pathogenic microorganisms which may be present in a particular single-line food processing room 140 will migrate out of that single-line food processing room 140 into either the other areas of the second region 104 or another single-line food processing room 140 is reduced. Because of the additional controls on movement of personnel between the third region 106, i.e., the single-line food processing rooms 140 and the delivery area 130, and the other portions of the second region 104, the delivery area 130 and the single-line food processing rooms 140 can also be referred to as the "secure areas".

Figure 2:
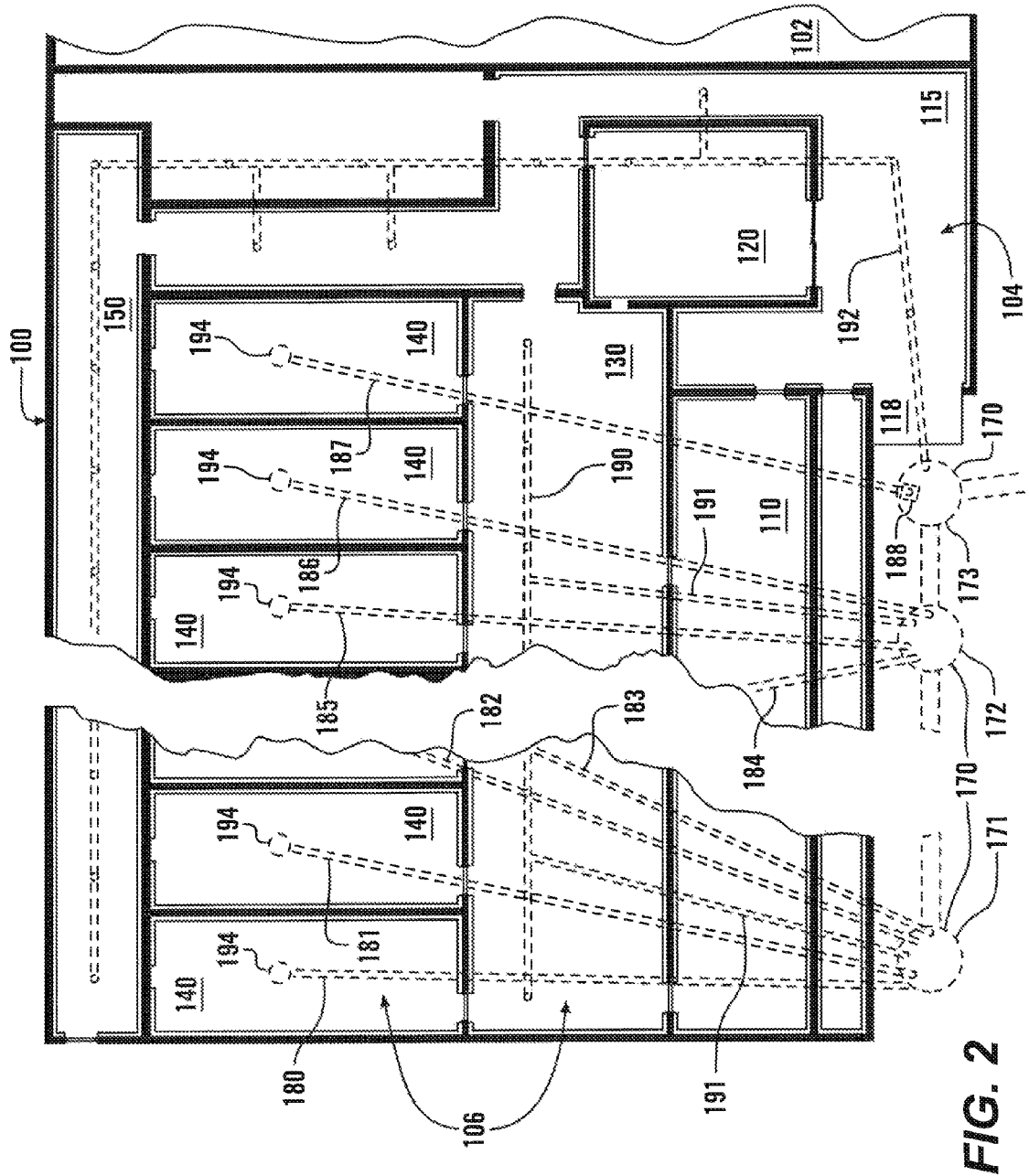
FIG. 2 is a schematic top plan view illustrating one exemplary embodiment of a drain system usable with the first exemplary embodiment of the food processing facility and related systems according to this invention shown in FIG. 1.

FIG. 2 illustrates a first exemplary embodiment of a drain system usable in the food processing facility 100 according to this invention. Conventional drains are a potential source of environmental contamination. This drain system forms another aspect of the food processing facility 100 that is usable to reduce the likelihood that *Listeria* or other pathogenic microorganisms will migrate from the other portions of the third region 106 or the second region 104 into the single-line food processing rooms 140, or vice versa, or between individual single-line food processing rooms 140. As shown in FIG. 2, each single-line food processing room 140 has its own dedicated drain line 180-187. As shown in FIG. 2, each drain line 180-187 extends directly from a particular single-line food processing room 140 to one of a number of collection manholes or catch basins 170, such as the manholes or catch basins 171, 172, and 173.

In particular, as shown in FIG. 2, the various drain lines 180-187 do not intersect each other prior to reaching the particular catch basin 170 to which they are connected. Additionally, the outlet of each of the drain lines 180-187 connects to and preferably discharges by gravity into the corresponding catch basis 170 at a location that is spaced apart from the outlets of the other drains 180-187 both circumferentially, as can be seen in FIG. 2, and/or axially. That is, the outlet for each drain 180-187 into the corresponding catch basin 170 is spaced apart from the other outlets both along the circumference of the catch basin 170 and along the axis of the catch basin 170 that extends into and out of the drawing of FIG. 2. Accordingly, any waste materials flushed down a particular one of the drains 180-187 from a particular single-line food processing room 140 into the corresponding catch basin 170 generally will not splash into, be directed into, or otherwise contaminate any of the other ones of the drains 180-187 that are connected to that catch basin 170. While FIG. 2 shows only food processing room drains 180-187, it should be understood that the facility 100 will have as many such drains as there are such single-line food processing rooms 140.

Furthermore, the common drain lines 190, such as the drain lines 191 and 192, which are designed to receive waste materials from, for example, the distribution room 130 and/or the receiving room 150, respectively, are also connected to the catch basins 170 at locations that are spaced apart from the drain lines 180-187 both circumferentially and/or axially, so that waste from the various single-line food processing rooms 140 does not contaminate the drain lines 190 or vice versa. In various exemplary embodiments, the drain lines 180-187 are designed with minimum bends or elbows, such that there are minimal locations in the drain lines 180-189 where waste material can collect within those drain lines 180-187.

In various exemplary embodiments, each of the drain lines 180-187 can be fitted with an end cap, damper or valve 188 or other appropriate device that allows that drain line 180-187 to be sealed, such that it can be backfilled for its entire length from the corresponding single-line food processing room 140 with a cleaning and/or sanitizing agent or the like. In various exemplary embodiments, this would allow that drain line 180-187, if it were to become contaminated with *Listeria* or other pathogenic microorganisms, to be cleaned and/or sterilized to remove such contamination. In various exemplary embodiments, such caps, valves or other appropriate structures are located at the outlet ends of the drain lines 180-187 at the catch basins 170. In various exemplary embodiments, the catch basins 170 are connected to a waste disposal system, such as a sewer system, a waste water treatment system, or the like. In various exemplary embodiments, the catch basins 170 are located outside of the walls of the food processing facility 100.

In various exemplary embodiments, the floors of the single-line food processing rooms 140 are sloped toward the drain fixtures 194 at the upper ends of the drain lines 180-187, such that any liquids, including cleaning and flushing liquids which may drop or be directed onto the sloped floors, are directed into the drain fixtures 194 and the drain lines 180-187, regardless of where in the single-line food processing room 140 the liquid may contact the floor. In various exemplary embodiments, the drain fixtures 194 may be constructed of anti-microbial stainless steel, such as are supplied by Unitherm Food Systems of Bristow, Okla.

Figure 3:
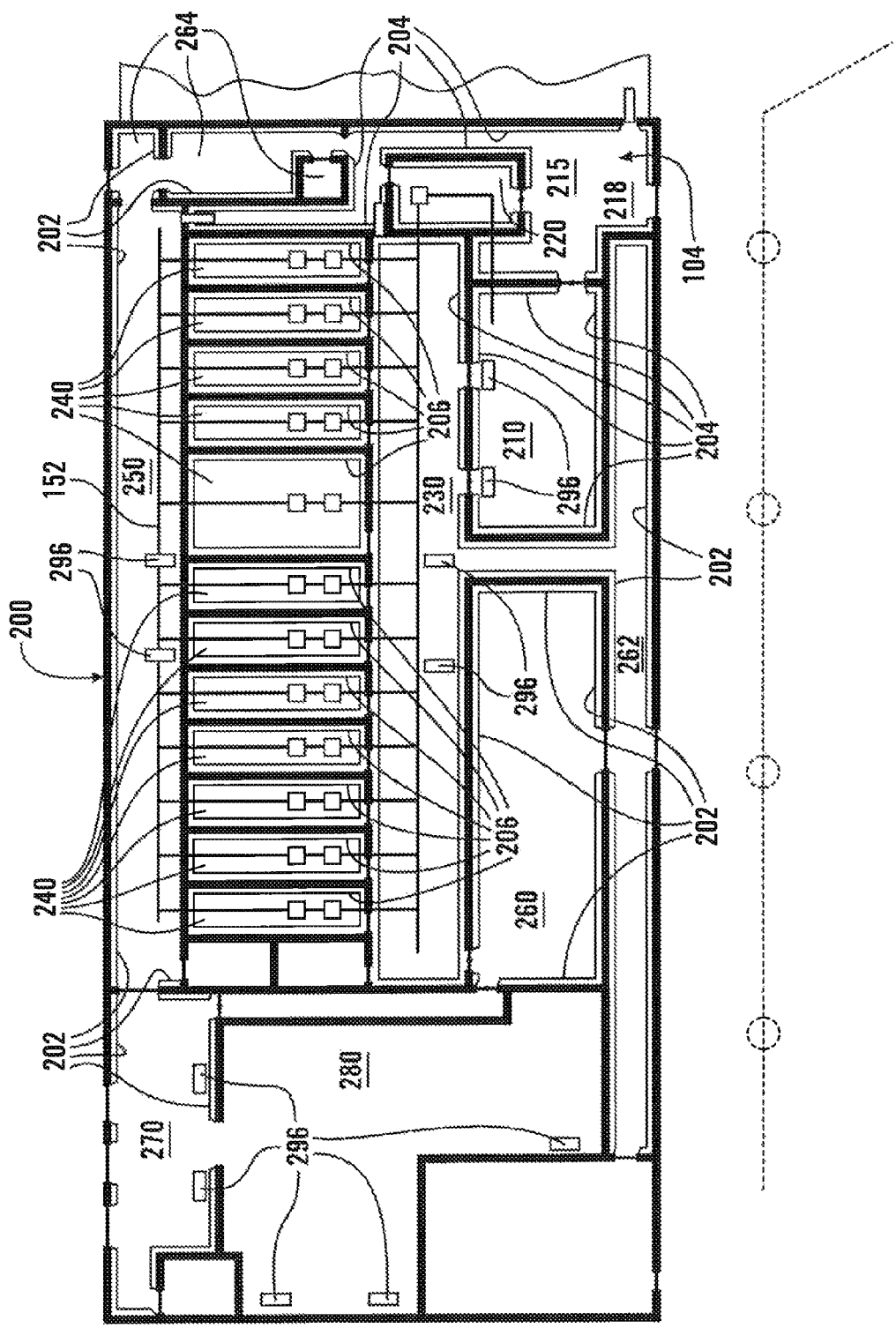
FIG. 3 is a schematic top plan view of a second exemplary embodiment of a food processing facility and related systems according to this invention.

FIG. 3 illustrates a second exemplary embodiment of a food processing facility 200 according to this invention. It should be appreciated that the structures shown in FIG. 3 generally correspond to similar structures shown in FIG. 1 and/or FIG. 2, including door openings and doors between the various rooms and areas as shown in FIGS. 1 and 2, and otherwise as may be necessary or convenient. FIG. 3 additionally shows a number of exemplary curb structures used within the storage cooler 210, the treatment room 220, the delivery area 230, the various single-line food processing rooms 240, the receiving area 250 and the other regions which form the various portions of the second region 104. These curbs are located at the base of the walls of the various portions of the food processing facility 200 used to divide the space within the second region 104 into the various rooms discussed above. These curbs may include three different types of curbs, which have increasing abilities to slow down or prevent the migration of *Listeria* or other pathogenic microorganisms along or under the walls within the regions 104 and 106.

As shown in FIG. 3, these curbs include a first type of curb 202, which is used to line the interior surfaces of walls of those spaces where the processed food product that is processed within the food processing facility 200 is not expected to be present. This first type of curb 202 can also be used to line those walls where the processed food product is present in only a packaged state. Such regions include hallway areas 262, maintenance areas 264, dry supply storage area 260, the receiving area 250, a shipping dock area 270 and the like.

The second type of curb 204 is used to line those walls where it is likely that the processed food product to be processed in the food processing facility 200 will be present, either in a sealed casing or in an unpackaged state but is not being processed. Such regions include the storage cooler area 210, the buffer zone 215, the treatment room 220, the delivery area 230 and adjacent areas. A third type of curb 206 is used to line the interior walls of the single-line food processing rooms 240.

In general, the first type of curb 202 provides relatively lesser protection against the migration of *Listeria* and other pathogenic microorganisms. The second type of curb 204 provides an intermediate level of protection against migration of *Listeria* and other pathogenic microorganisms. The third type of curb 206 provides relatively greater protection against the migration of *Listeria* and other pathogenic microorganisms. In general, the curbs 202-206 protect against migration of such pathogenic microorganisms along and under the walls separating the various spaces within the regions 104 and 106 of the food processing facility 200. In particular, the curbs 202-206 generally prevent water and other liquids from moving from the enclosed spaces within the regions 104 and 106 to spaces under the walls, either along the walls or to the other sides of the walls, because *Listeria* and other pathogenic microorganisms can be carried by movements of water and other liquids under the walls and into other spaces within the regions 104 and 106 of the food processing facility 200 unless measures are taken to prevent such intrusions and movements.

FIG. 3 also shows one exemplary embodiment of a cooling and air circulation system for the storage cooler 210, the delivery area 230, the receiving area 250, the shipping dock area 270 and the finished product cooler 280, which includes a plurality of evaporator cooler fans 296 mounted in the upper portions of the identified areas. FIG. 1 shows the same representative evaporator cooler fans 196. The evaporator coolers may be positioned parallel to one or more walls of an enclosed space, as shown in the storage cooler 210, the shipping dock area 270 and the finished product cooler 280, or perpendicular to a wall as shown in back-to-back relation in the elongated spaces of the delivery area 230 and the receiving area 250, or in any other position which will result in a vigorous circulation of cold air sufficient to provide constant air movement over surfaces of and/or within the identified areas and their contents to prevent the condensation or accumulation of moisture on any such surfaces. The maintenance of dry surfaces within the facility 200 by the circulation of cold air minimize the opportunities for *Listeria* or other pathogens to colonize on, and subsequentially spread from such surfaces within such areas to elsewhere within the facility 200.

Figure 4:
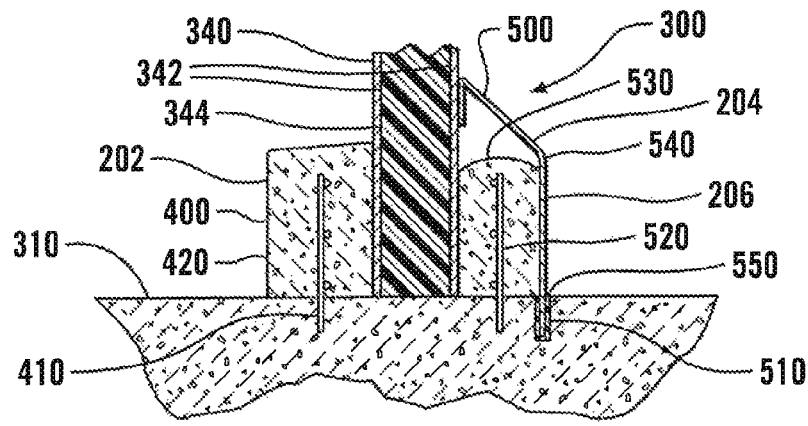
FIG. 4 is a cross-sectional view of second and third exemplary embodiments of curb structures according to this invention.

FIG. 4 shows one exemplary embodiment of a wall and floor structure 300 and various exemplary embodiments of curb structures 400 and 500 usable in food processing facilities 100 or 200 according to this invention. As shown in FIG. 4, the wall and floor structure 300 comprises a floor 310 against or into which a wall 340 is set. In general, the floor 310 is formed of concrete or other hard and generally impervious substance and may be coated with a lithium-based sealant or other appropriate protective coating. In various exemplary embodiments, the walls 340, as well as the ceilings, are constructed of 4" thick freezer panels 344 with urethane foam insulation or the like having an insulating value of R43.5. Typically, all joints between wall and ceiling panels 340 are dovetailed to provide foam-to-foam interfaces and are caulked to prevent any movement of water between or along the panels. The walls 340 may include galvanized steel skins 342 placed on both sides of the foam panels 344. In various exemplary embodiments, water-impervious polymer coatings are formed over the steel skins 342.

It should be appreciated that, in various exemplary embodiments, the curbs 202 are formed of concrete as shown in FIG. 4 coated similarly to the floor 310. In contrast, in various exemplary embodiments, the curbs 204 and 206 are keyed stainless steel curbs such as that shown in FIG. 4. In various exemplary embodiments, the curbs 206 use anti-microbial stainless steel curbs manufactured by Unitherm Food Systems. The curbs 204 are standard stainless steel.

As shown in FIG. 4, a simple concrete curb 400 includes a concrete mass 420 that contains reinforcing iron bars 410. The iron rebar 410 also attaches the concrete curb 400 to the floor 310. Caulking or other sealants are provided at the joints between the concrete curb 400 and the floor 310, and the concrete 400 and the galvanized steel skin 342 on a wall 340.

As further shown in FIG. 4, a second type of curb 500 includes a groove 510 cut into the floor 310, as well as reinforcing iron bars 520 that extend into the floor 310. A concrete mass 530 extends around the reinforcing iron rebar 520. A stainless steel cover 540 extends around the concrete mass 530 and into the groove 510. The top of the stainless steel curb 540 is connected to the stainless steel skin of the wall 340. An epoxy or polyurethane or the like seal 550 is placed in and/or around the groove 510 to seal the stainless steel curb 540 into the groove 510 to form an impervious barrier to liquids that may be present on the wall 340 and/or the floor 310. It should be appreciated that the curb structure 500 is particularly useful as the curbs 204 and 206 described above. Other curb designs which provide a liquid impervious barrier between the floor and the walls under expected conditions, and which also provide physical protection to the bases of the walls to reduce physical damage to the walls from impacts from lift trucks, pallets, equipment or the like, and/or which further inhibit the presence or growth of microorganisms are also acceptable for the curbs 202, 204 and 206.

Figure 5:
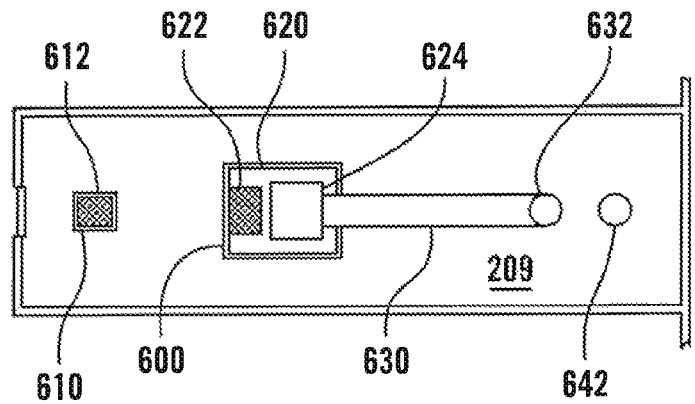
FIGS. 5 and 6 are schematic top and side views, respectively, of a first exemplary embodiment of a ventilating and air conditioning system for a food processing room according to this invention.
Figure 6:
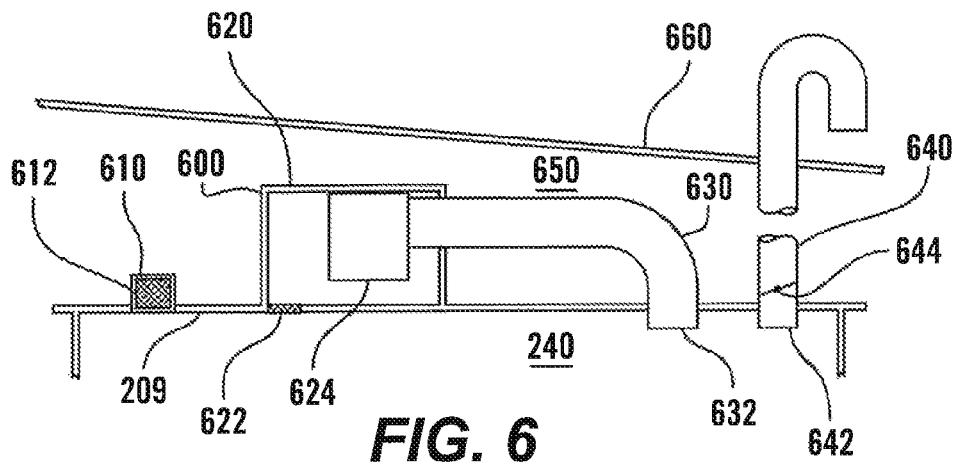

FIGS. 5 and 6 are top and side plan views of the ventilating and air conditioning (VAC) system for each of the plurality of single-line food processing rooms 140 and 240 described above. That is, in various exemplary embodiments, each of the single-line food processing rooms 140 and 240 has its own separate VAC system, for which FIGS. 5 and 6 illustrate one exemplary embodiment. Each separate VAC system 600 is mounted on the outer surface of the ceiling 209 for the corresponding single-line food processing room 140 to which that VAC system 600 is connected.

As shown in FIGS. 5 and 6, each separate VAC system 600 includes an air inlet 610 in which a high efficiency particulate filter 612, such as a high-efficiency particulate air (HEPA) filter, is fitted. The VAC system 600 also includes a "doghouse" 620 in which a ventilation and air conditioning unit 624 is mounted. The air inlet 610 connects the corresponding single-line food processing room 140 or 240 to a space 650 above the single-line food processing rooms 140 or 240, while an air inlet 622 connects that single-line food processing room 140 or 240 to the interior of the doghouse 620. Accordingly, the ventilation and air conditioning unit 624 draws air from the single-line food processing room 140 or 240 through the inlet 622, possibly conditions the withdrawn air, and returns the withdrawn air to that single-line food processing room 140 or 240 through a duct 630 and a return inlet 632. It should be appreciated that all initial and make-up air that is supplied to the separate VAC systems 600 and has been drawn from outside the food processing facility 100 or 200 first passes through an outside air intake 670, as shown in FIG. 1, and into the space 650 above the single-line food processing rooms 140 or 240. In various exemplary embodiments, the outside air intake 670 also includes a HEPA filter 672 or the like. Because each inlet 610 also includes an intake HEPA filter 612, all air drawn from outside the food processing facility 100 or 200 passes through two HEPA filters or the like before entering into the individual single-line food processing rooms 140 or 240.

The VAC system 600 for this particular single-line food processing room 140 or 240 circulates the air into that single-line food processing room 140 or 240 through the duct or air plenum 630 at near freezing-level temperatures and relatively high speeds to create a positive air pressure within that single-line food processing room 140 or 240. That is, a pressure greater than ambient atmospheric pressure is created in each single-line food processing room 140 or 240 by the VAC system 600. Accordingly, no ambient air will be able to flow from the rest of the food processing facility 100 or 200 into any of the single-line food processing rooms 140 or 240. Rather, during food processing operations, room air will flow out of each of the single-line food processing rooms 140 or 240 through the openings through which the incoming and outgoing transport conveyors pass between the delivery area 130 or 230 and the receiving area 150 or 250.

If any air needs to be exhausted from the single-line food processing room 140 or 240, such as after a cleaning operation, an air outlet 642 in the ceiling 209 allows air to pass from the single-line food processing room 140 or 240 into an exhaust duct 640, controlled by a damper and control 644, which guides exhaust air through a roof 660 of the facility 100 or 200 and thus entirely out of the food processing facility 100 or 200, while directing that exhaust air away from the air inlet 670. In various exemplary embodiments, all exhaust air from any portion of the facilities is exhausted entirely out of the facilities to the outdoors.

It should be appreciated that, in various exemplary embodiments, the air is introduced into the particular single-line food processing rooms 140 or 240 by the VAC system 600 at a substantial velocity of, for example, 22 miles per hour, to quickly dry and maintain dry the floor and any equipment surfaces to avoid wet surfaces where *Listeria* or other pathogenic microorganisms could grow or prosper. In various exemplary examples, this air is exhausted through the exhaust duct 640 to the outside during and after the introduction of water or other liquids into the corresponding single-line food processing room 140 or 240, such as by daily cleaning, backfilling of a room drain and floor area with a disinfectant, or the like.

It should also be appreciated that, in various exemplary embodiments, any piping of any kind entering the single-line food processing rooms 140 or 240, or any other areas of the plant, is preferentially orienting vertically down from the utility space above and through the ceiling 209, such that horizontal pipe runs extending within the single-line food processing rooms 140 or 240 and other plant areas are eliminated or minimized, as horizontal pipe can provide surfaces where moisture can condense and collect.

It should also be appreciated that, in various exemplary embodiments, a selected single-line food processing room 140 or 240 and all of the contents of that single-line food processing room 140 or 240, may be heated to a temperature and for a time that should be sufficient to be lethal to any *Listeria* bacteria or other pathogenic microorganisms that might be found on, or suspected to be present on, the devices forming the single-line food processing system, including the food processing devices, the packaging equipment or any other locations within that single-line food processing room 140 or 240. Thus, in such exemplary embodiments, it would not be necessary to completely remove the equipment or physically reach every pathogen on the equipment in that single-line food processing room 140 or 240 in order to sanitize the equipment in that single-line food processing room 140 or 240.

It should be appreciated that, in such exemplary embodiments, the walls 208 and the ceiling 209 used to separate each of the single-line food processing rooms 140 or 240 from each other and from the areas within the region 104 of the food processing plant 200 should be designed to be able to withstand experiencing such elevated temperatures for sufficiently long periods of time to allow the food processing equipment in that single-line food processing room 140 or 240 to be heat sterilized. It should also be appreciated that it may be desirable, depending on the construction of the walls 208 and/or the ceiling 209, to warm up one or more adjacent ones of the normally refrigerated single-line food processing rooms surrounding the single-line food processing room 140 or 240 to be sterilized, or to heat one or more adjacent single-line food processing rooms 140 or 240 having a common-pour floor section with the single-line food processing room 140 or 240 to be sterilized, to avoid creating too large a temperature differential between the single-line food processing room 140 or 240 being sterilized and the surrounding single-line food processing rooms 140 or 240. It should also be appreciated that the temperature of the room or rooms to be heated could be raised and lowered slowly between normal operating temperature and heat sterilization temperature to avoid structural damage.

Figure 7:
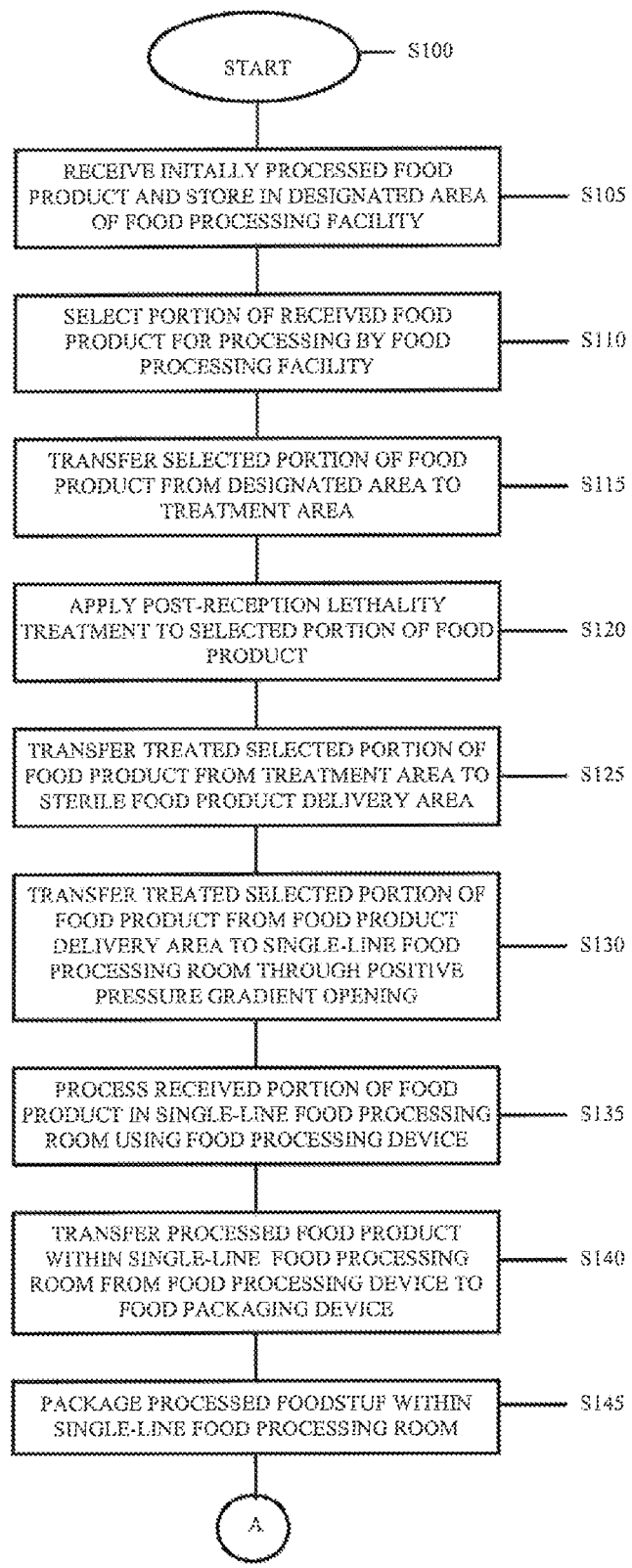
FIGS. 7 and 8 are a flowchart outlining one exemplary embodiment of a method for processing a food product according to this invention.
Figure 8:
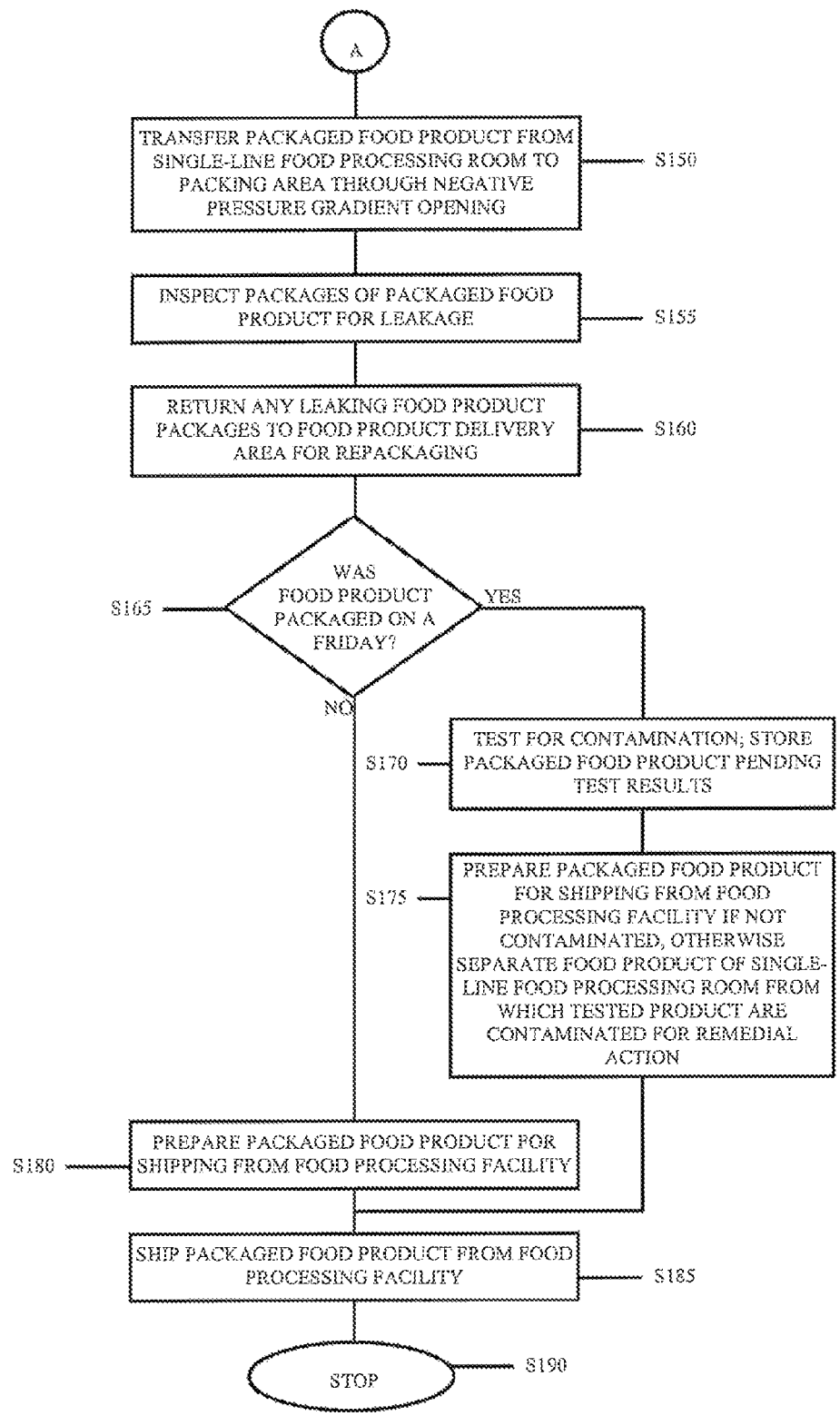

FIGS. 7 and 8 are a flowchart outlining one exemplary embodiment of a method for handling processed food product(s) within a food processing facility according to this invention. As shown in FIGS. 7 and 8, the method begins in step S100 and continues to step S105, where an initially-processed food product is received and possibly stored in a designated area of the food processing facility. As outlined above, in various exemplary embodiments, this designated area can be a short-term storage cooler or the like. Next, in step S110, a portion of the received food product is selected for processing by the food processing facility. In various exemplary embodiments, as outlined above, the selected portion can be a meat log or the like. Next, in step S115, the selected portion of the food product is transferred from the designed area to a treatment area or the like. Operation then continues to step S120.

In step S120, at least one post-processing lethality treatment is applied to the selected portion of the food product. As outlined above, this is done to reduce the likelihood that an opportunistic adulterant, such as *Listeria* or other adulterating microorganism, has colonized the surface of the selected portion of the food product to be processed. Next, in step S125, the selected portion of the food product is transferred from the treatment area or the like to a near-sterile food product delivery area. In general, the selected portion is transferred using any desirable appropriate devices which reduce the likelihood that the surface of the food product will be recolonized with *Listeria* or other pathogenic microorganisms as it is transferred from the treatment area or the like through the food product delivery area to the particular single-line food processing room 140 in which that food product will be further processed. It should be appreciated that steps S120 and S125 can be reversed, in that the food product can be treated after it is in the delivery area rather than before it enters the delivery area. Then, in step S130, the treated selected portion of the food product is transferred from the food product delivery area to a single-line food processing room through an opening in the wall separating the food product delivery area from the single-line food processing room. It should be appreciated that, in various exemplary embodiments, a positive pressure gradient, as outlined above, is applied to this opening to create a pressure differential across that opening. By forming a positive pressure gradient from the interior of the single-line food processing room to the food product delivery area, air moves through the opening toward the food product delivery area from the single-line food processing room. This tends to prevent airborne microorganisms, such as *Listeria*, from entering the single-line food processing room. Operation then continues to step S135.

In step S135, the received portion of the food product is processed in the single-line food processing room using a set of one or more food processing devices. Then, in step S140, the processed food product is transferred within the single-line food processing room from the one or more food processing devices to one or more food packaging devices. Next, in step S145, the processed food product is packaged within the single-line food processing room. Operation then continues to step S150.

In step S150, the packaged food product is transferred from the single-line food processing room to a receiving area through an opening in the wall separating the single-line food processing room from the receiving area. In various exemplary embodiments, a pressure gradient is created across that opening from the single-line food processing room to the receiving area to generate a unidirectional flow of air from the single-line food processing from into the receiving area. Next, in step S155, the packages of packaged food product are inspected for leakage or other faults with the packaging such that *Listeria* or other pathogenic microorganisms could migrate into that packaging. Next, in step S160, any leaking or defective food product packages are returned to the single-line food processing room 140 from which they came for re-sterilization and repackaging in the single-line food processing room, are discarded or otherwise appropriately dealt with. Operation then continues to step S165.

In step S165, a determination is made whether the food product was packaged on a Friday or other designated day. It should be appreciated that Friday is used to allow the food product packaged on that day to be extensively inspected, sampled and tested for the presence of pathogens, while being held a sufficient time to receive the testing results from the lab before the product is shipped. Thus, it should be appreciated that any particular day of the week or any particular shift could be used in place of Friday in step S165, so long as sufficient time is allowed to pass before step S170 is carried out relative to such packaged food products. In particular, if the food was packaged on Friday or other designated time for such tests, operation continues to step S170. Otherwise, operation jumps to step S180.

In step S170, the packaged food product(s) are stored until Monday, or for some other necessary or desired interval, while awaiting receipt of the test results showing that the food processing product is acceptable. Next, in step S175, if no contamination is found, the packaged food product(s) are prepared for shipping from the food processing facility. Otherwise, if contamination is found in any of the packaged food product(s) tested, appropriate steps may be taken to identify the single-line food processing room(s) within which the contaminated product was processed, to segregate all product from that room(s), and to take appropriate remedies or action to identify the source of the contamination and to properly dispose of or subject to additional lethality treatment the contaminated product and facilities. Operation then jumps to step S185.

In contrast, in step S180, the uninspected packaged food product(s) are prepared for immediate shipping from the food processing facility. Then, in step S185, the packaged food product(s) are shipped from the food processing facility to either a downstream food processing facility, a downstream warehouse or other storage location, a retailer or the like. Operation then continues to step S190, where operation of the method ends.

Figure 9:
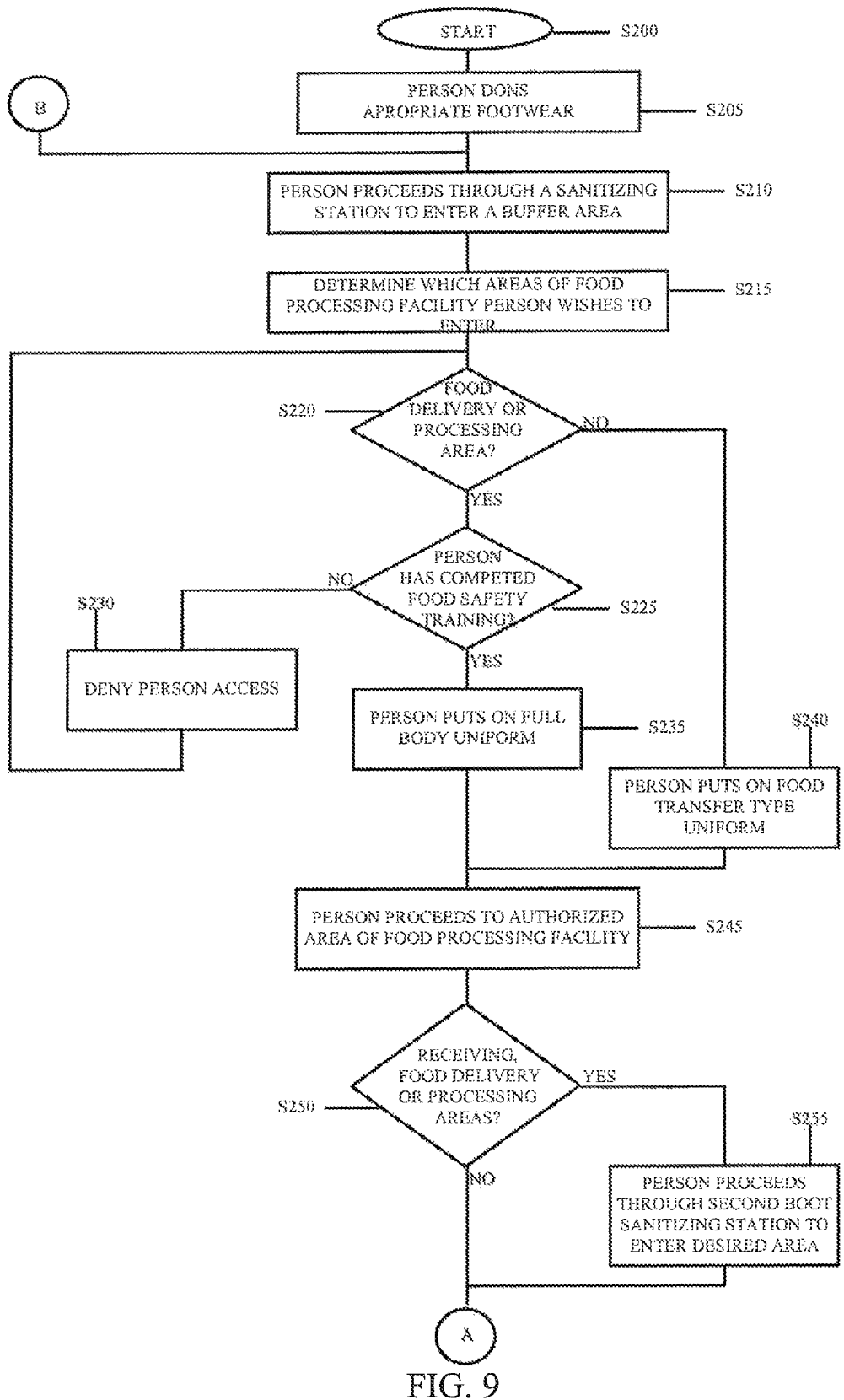
FIGS. 9 and 10 are a flowchart outlining one exemplary embodiment of a method for controlling movement of personnel within a food processing facility according to this invention.
Figure 10:
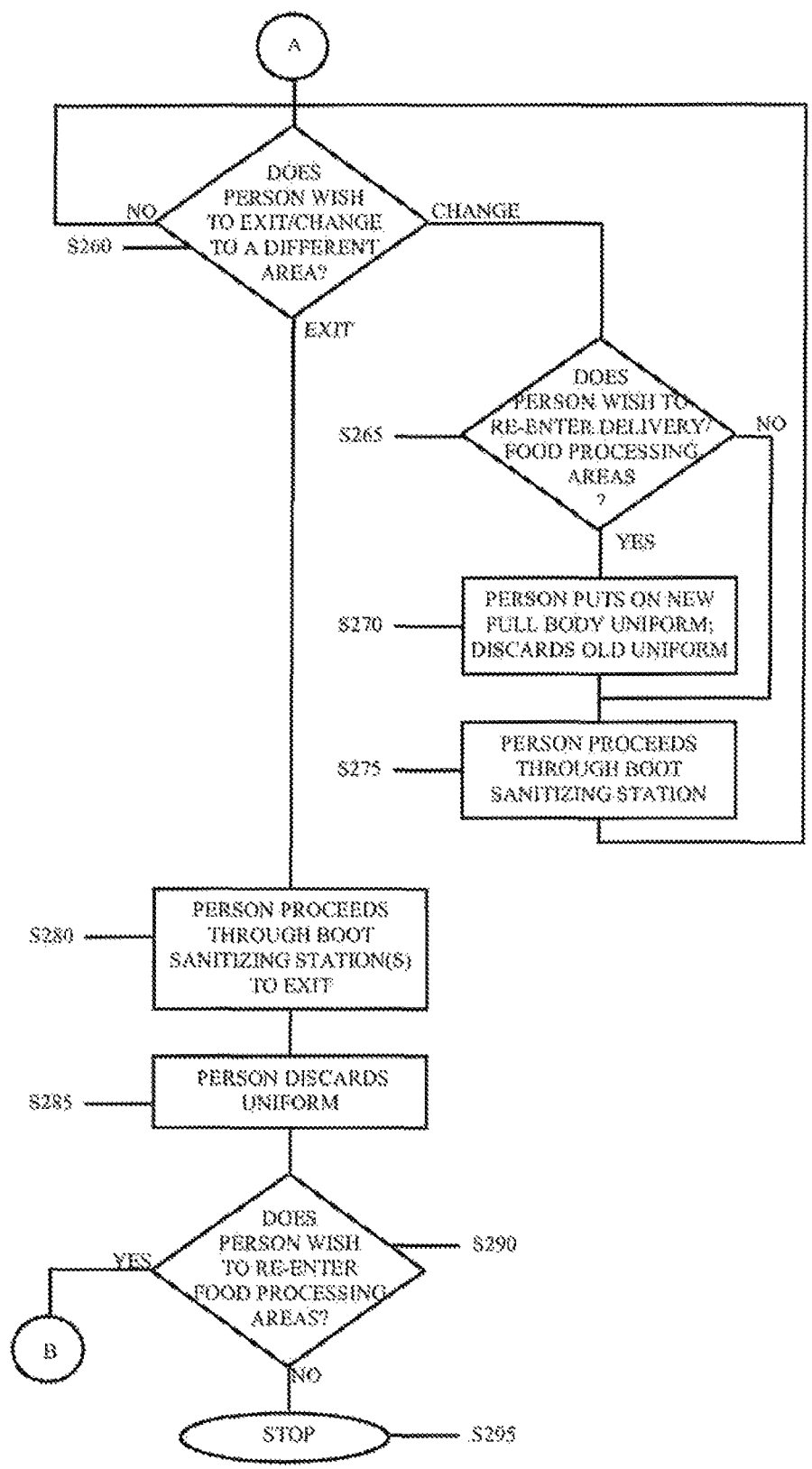

FIGS. 9 and 10 are a flowchart outlining one exemplary embodiment of a method for controlling movement of personnel within a food processing facility according to this invention. As shown in FIGS. 9 and 10, operation of the method begins in step S200, and continues to step S205, where a person wishing to enter the semi-secure or secure areas of the food processing facility dons appropriate footwear, such as, for example, rubber boots. Then, in step S210, the person proceeds through a sanitizing station to enter a buffer area. In the buffer area the person will be able to don an appropriate uniform. Next, in step S215, a determination is made which areas of the food processing facility the person wishes to enter. Operation then proceeds to step S220.

In step S220, a determination is made whether the person wishes to enter the food delivery or food processing areas, i.e., the secure areas of the food processing facility. If so, operation continues to step S225. Otherwise, operation jumps to step S240. In step S225, a determination is made whether the person has completed appropriate food safety training. If not, operation continues to step S230. Otherwise, operation jumps to step S235. In step S230, because the person has not completed the appropriate food safety training to enter the food delivery or food processing areas, the person is denied access to these areas. Operation then returns to step S220. In contrast, in step S235, the person, having completed the appropriate food safety training, and thus being authorized to enter the food delivery or food processing areas, dons a full-body or other secure area uniform. Operation then jumps to step S245. In further contrast, in step S240, because the person does not wish to enter the food delivery or food processing areas, the person puts on a food transfer-type, or semi-secure area-type, uniform. Operation then proceeds to step S245.

In step S245, the person proceeds from the buffer area to the authorized area(s) of the food processing facility the person, assuming the proper uniform is being worn, wishes to visit. Next, in step S250, a determination is made whether the person wishes to enter the packaged food receiving area, the food delivery area, or the food processing areas. If so, operation continues to step S255. Otherwise, operation jumps to step S260. In step S255, the person proceeds to a second boot sanitizing station to enter the desired area of the food processing facility. Operation then proceeds to step S260.

In step S260, a determination is made whether the person wishes to exit the food processing facility completely or whether the person wishes to change to a different area of the food processing facility. If not, operation returns to step S260. Otherwise, if the person wishes to change which area of the food processing facility the person is in, operation continues to step S265. Else, if the person wishes to exit the secure and semi-secure areas, operation jumps to step S280. In step S265, a determination is made whether the person wishes to re-enter the food delivery or food processing areas from the buffer area or one of the other semi-secure areas of the food processing facility, such as the treatment room, the receiving area, the packaged food receiving area, the cold storage area or the like. If so, operation continues to step S270. Otherwise, operation jumps to step S275. In step S270, the person puts on a new full-body uniform and recycles the old full-body uniform for sanitation. Then, in step S275, the person proceeds to the appropriate boot sanitizing station. For example, if the person is leaving the food delivery or food processing areas into one of the semi-secure areas, the person will proceed through a footwear sanitizing station. Likewise, if the person is proceeding from the packaged food receiving area to another one of the semi-secure areas, the person will proceed through the appropriate footwear sanitizing station. Operation then returns to step S260.

In contrast, in step S280, the person proceeds through the footwear sanitizing stations necessary to reach the unsecured areas of the food processing facility. Then, in step S285, the person recycles for sanitation whatever uniform the person is currently wearing. Next, in step S290, a determination is made whether the person wishes to re-enter the food processing area. This will occur when the person is returning from a visit to the restroom or from lunch or some other break. If so, operation returns to step S210. Otherwise, operation continues to step S295, where operation of the method stops.

Figure 11:
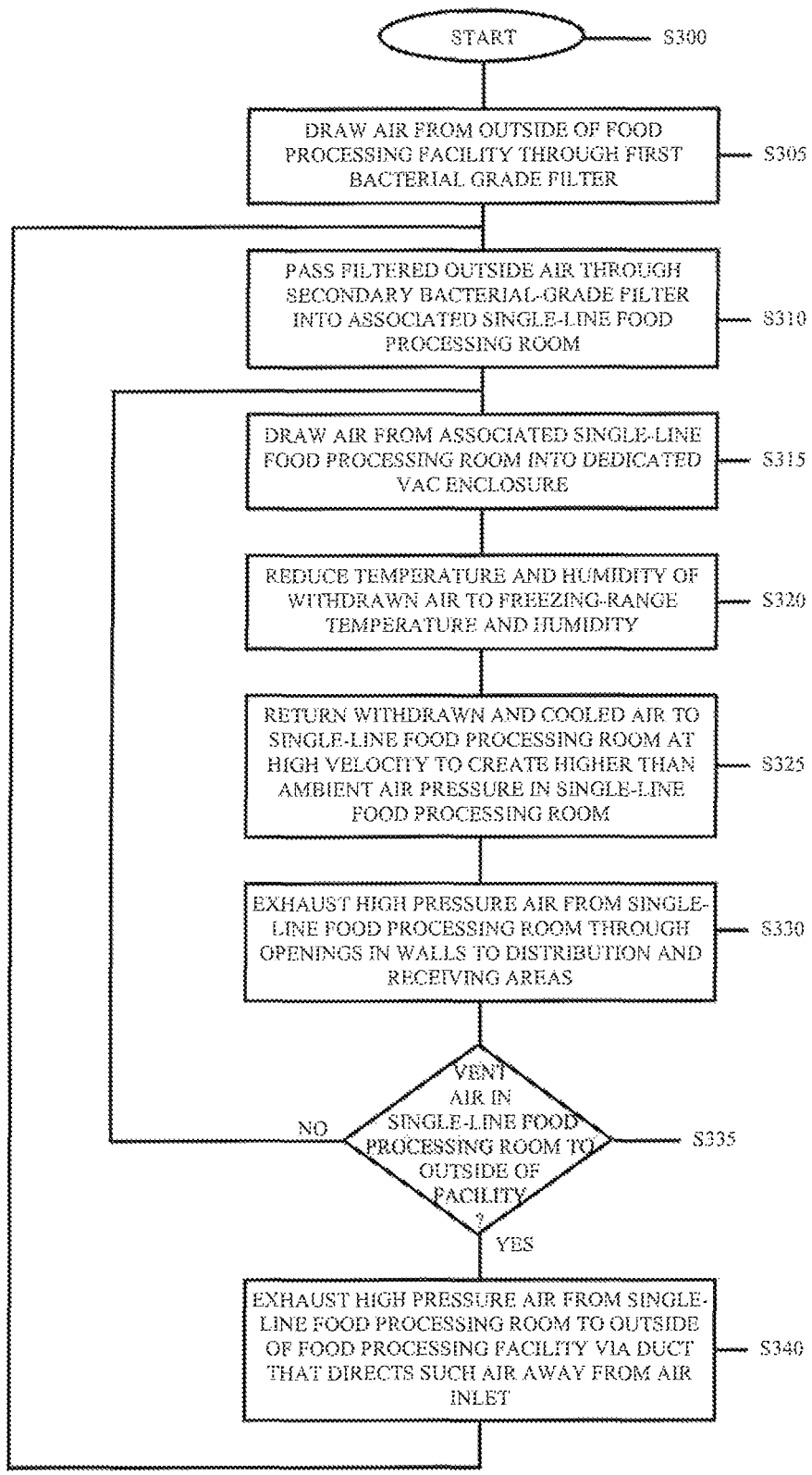
FIG. 11 is a flowchart outlining one exemplary embodiment of a method for providing heating, ventilation and air conditioning to a given food processing room according to this invention.

FIG. 11 is a flowchart outlining one exemplary embodiment of a method for cooling and ventilating a single-line food processing room according to this invention. As shown in FIG. 11 beginning in step S300, operation of the method continues to step S305, where air is drawn from outside of the food processing facility through an air inlet, through a bacterial grade filter, such as a HEPPA air filter or other appropriate filter device and into a plenum that supplies at least the food processing rooms. Then, in step S310, the filtered outside air is allowed to pass through a second filter into the associated single-line food processing room to provide twice filtered make-up air as needed. Next, in step S315, air is withdrawn from the associated single-line food processing room into a dedicated ventilating and air conditioning (VAC) enclosure. Operation then continues to step S320.

In step S320, the temperature and humidity of the withdrawn air are reduced to near or below freezer-range temperature and humidity. Next, in step S325, the withdrawn and cooled air is returned to the single-line food processing room at high velocity to create higher than ambient air pressure in the single-line food processing room and maintain room temperature near freezing. Then, in step S330, due to the higher than ambient air pressure in the single-line food processing room, high pressure air is unidirectionally exhausted from the single-line food processing room through the openings in the walls that lead to the delivery and receiving areas. Operation then continues to step S335.

In step S335, a determination is made whether the air in the single-line food processing room needs to be vented rather than recirculated. If not, operation returns to step S315. Otherwise, operation continues to step S340, where the high pressure air is exhausted from the single-line food processing room to outside of the food processing facility via one or more damper controlled ducts that direct the exhausted air away from the air inlet that is used to draw air from outside of the food processing facility into the bacterial grade filter. Operation then returns to step S310.

It should be understood that the order of the steps of each of the foregoing methods is not limited to the order described and illustrated, but in exemplary embodiments can include any such step in any appropriate order which does not preclude or compromise other steps of the method.

The above-outlined various exemplary embodiments of various structures, systems and techniques are each useful in reducing the ability of *Listeria* or other pathogenic microorganisms to enter food processing facilities, or migrate between, or cross contaminate, different food processing devices or food processing device lines. Thus, each of the various structures, systems and methods described herein are separately useful. When such structures, systems and methods are combined into various combinations, the ability of *Listeria* and other pathogenic microorganisms to invade or migrate between different food processing devices and/or lines is even further reduced. Thus, it should be appreciated that food processing facilities, systems and methods according to this invention do not need to use all or even a plurality of the various structures, systems and techniques disclosed herein.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the invention is intended to embrace all known or earlier developed alternatives, modifications, variations, improvements and/or substantial equivalents.

What is claimed is:

1. A method for reducing contamination by an undesirable micro-organism within a food processing facility that processes a food product, comprising:

receiving a pre-cooked food product into the facility and holding the product in a designated semi-secure storage area of the food processing facility;

transporting selected portions of food product from the designated semi-secure storage area to an at least semi-secure treatment area and applying a post-reception lethality treatment directly to the food product;

transporting the treated portions of food product from the treatment area to a secure food product delivery area;

transporting the treated portions of the food product from the delivery area into selected ones of a plurality of secure area food processing rooms through positive pressure gradient openings therein, each food processing room comprising a single food processing line of series-associated food processing elements comprising at least one food processing device and at least one food packaging device, each food processing room maintained at a first substantially sterile level of cleanliness which substantially prevents the presence and growth of pathogenic microorganisms including *Listeria*, said food processing rooms each being individually atmospherically and structurally isolated from each other to effectively prevent any contamination in any one such food processing room or series-associated food processing elements therein from contaminating food products processed in any other of such plurality of food processing rooms and series-associated food processing elements therein, whereby each such single-line food processing room effectively comprises a separate food processing facility;

processing the food product portions in those selected isolated food processing rooms;

packaging the processed food product into closed packages in those selected isolated food processing rooms such that any micro-organisms outside of the packages will be unable to migrate into the interior of the packages as long as the packages remain closed; and transporting the closed packages out of those selected food processing rooms to a semi-secure packaged food receiving area through negative pressure gradient openings.

2. The method of claim 1, wherein the received pre-cooked processed food product portions are plastic-encased meat products, and wherein the encased meat products are passed through a sanitizing washer before reaching the at least semi-secure treatment area to remove any pathogens which may be present on the exterior of the casings, and wherein the washed casings are removed in the semi-secure treatment room prior to application of the post-reception lethality treatments directly to the exposed surfaces of the meat products in preparation for further food processing of the meat products in the secure food processing rooms.

3. The method of claim 2, wherein:
applying the lethality treatment directly to the processed meat product comprises at least one of:
passing the processed meat product through a steam treatment;
passing the processed meat product through a hot liquid bath;
passing the processed meat product through a radiant heat treatment, and
passing the processed meat product through a chemical sanitizer.

4. The method of claim 2, wherein transporting the treated food product into those selected secure food processing rooms comprises:
transporting the treated food product into a secure first area, at least those selected food processing rooms each having a passage to the first area; and
transporting the treated food product from the first area into each of those selected secure food processing rooms through the passage of each selected room.

5. The method of claim 4, wherein transporting the treated food product into those food processing rooms further comprises passing the treated food product through a chilling device that chills at least a surface region of the treated food product to a temperature that is at most about a freezing point of the treated food product.

6. The method of claim 4, further comprising maintaining at least those secure selected food processing rooms and the secure first area at a first level of cleanliness when transporting the treated food product into the first area and when transporting the treated food product from the first area into those food processing rooms.

7. The method of claim 6, wherein maintaining at least those selected food processing rooms and the first area at the first level of cleanliness when transporting the treated food product into the first area and when transporting the treated food product from the first area into those food processing rooms comprises at least one of:
limiting access to at least those secure food processing rooms and the secure first area to persons having at least a first predetermined level of food safety training;
requiring persons entering at least one of each of those food processing rooms or the first area to wear a clean first-type set of clothing; and
requiring persons entering at least one of each of those food processing rooms or the first area to undergo a first cleaning procedure prior to entering the first area.

8. The method of claim 4, further comprising:
having the secure first area at a first air pressure;
maintaining each of those selected secure food processing rooms at air pressures greater than the first air pressure;
wherein transporting the treated food product from the first area into those food processing rooms comprises passing the treated food product through positive pressure gradient passages from the first area into those food processing rooms while passing the ambient atmosphere through the passages from those food processing rooms into the first area.

9. The method of claim 8, wherein maintaining each of those selected food processing rooms at air pressures greater than the first air pressure comprises separately supplying air into each selected food processing room by a separate dedicated ventilation and cooling subsystem for each selected food processing room at a rate that increases the air pressure in that food processing room to a point that is above the first air pressure.

10. The method of claim 8, wherein:
applying the lethality treatment to the food product before transporting the food product into those secure food processing rooms comprises applying the lethality treatment in an at least semi-secure treatment room; and
transporting the treated food product into the secure first area comprises transporting the treated food product from the treatment room to the first area.

11. The method of claim 10, further comprising maintaining the at least semi-secure treatment room at a second air pressure that is lower than the first air pressure, wherein transporting the treated food product from the treatment room to the secure first area comprises passing the treated food product through a passage from the treatment room into the first area while passing the ambient atmosphere through the passage from the first area into the treatment room.

12. The method of claim 11, wherein maintaining the treatment room at the second air pressure comprises exhausting the atmosphere in the treatment room to outside of the food processing facility at a rate that lowers the air pressure in the treatment room to a point below the first air pressure.

13. The method of claim 1, wherein transporting the food product into those secure selected food processing rooms comprises:
holding the food product in an at least semi-secure first area until the food product is to be processed in those selected food processing rooms;
transporting the food product from the first area into a secure second area, at least those selected food processing rooms each having a passage to the second area; and
transporting the food product from the second area into those selected food processing rooms through their respective connecting passages.

14. The method of claim 13, further comprising:
maintaining the first area at a first at least semi-secure level of cleanliness when holding the food product in the first area and when transporting the food product from the first area into the second area;
maintaining at least those selected food processing rooms and the second area at least at a second secure level of cleanliness which is greater than the first level of cleanliness when transporting the food product from the first area into the second area and when transporting the food product from the second area into those selected secure food processing rooms.

15. The method of claim 14, wherein maintaining those selected secure food processing rooms and the secure second area at least at the second level of cleanliness when transporting the food product from the first area into the second area and when transporting the food product from the second area into those selected food processing rooms comprises maintaining those selected food processing rooms at a fourth level of cleanliness that is greater than the second level of cleanliness.

16. The method of claim 14, wherein maintaining at least the at least semi-secure first area at the first level of cleanliness when holding the food product in the first area and when transporting the food product from the first area into the secure second area comprises at least one of:
   requiring persons having entered at least the first area from a semi-secure third area, where the third area is at a third level of cleanliness that may be less than the first level of cleanliness, to wear at least a first-type set of clothing when in the first area; and
   requiring persons entering at least the first area from the third area to undergo a first cleaning procedure when passing from the third area into the first area.

17. The method of claim 16, wherein maintaining those selected secure food processing rooms and the second secure area at least at the second level of cleanliness when transporting the food product into the second area and when transporting the food product from the second area into those selected food processing rooms further comprises at least one of:
   limiting access to at least those selected food processing rooms and the second area to persons having at least a first predetermined level of food safety training;
   requiring persons entering any of those selected food processing rooms or the second area to enter from the first area;
   requiring persons entering any of those selected food processing rooms or the second area to wear a clean second-type set of clothing; and
   requiring persons entering any of those selected food processing rooms or the second area to undergo a second cleaning procedure when passing from the first area into any of those selected food processing rooms or the second area.

18. The method of claim 1, wherein:
   at least those selected secure food processing rooms each have at least a first passage to an at least semi-secure first area; and
   transporting closed packages out of those selected food processing rooms comprises transporting the closed packages from those selected food processing rooms into the first area through their respective first passages.

19. The method of claim 18, further comprising further packaging the closed packages of the processed food product within the first area for shipping to a downstream user of the food product.

20. The method of claim 18, further comprising:
   having the at least semi-secure first area at a first air pressure; and
   maintaining those selected secure food processing rooms at an air pressure that is greater than the first air pressure;
   wherein transporting the closed packages from those selected food processing rooms into the first area comprises passing the closed packages through the first passages from those selected food processing rooms into the first area while passing the ambient atmosphere through the first passages from those selected food processing rooms into the first area.

21. The method of claim 18, further comprising maintaining the first area at a first at least semi-secure level of cleanliness when transporting the closed packages from the selected food processing rooms into the first area.

22. A method for reducing contamination by an undesirable micro-organism within a food processing facility that processes a food product, wherein the food processing facility comprises:
   a plurality of food processing rooms, each food processing room comprising a secure area having a single food processing line of series-associated food processing elements comprising at least one food processing device and at least one food packaging device, each food processing room at a first substantially sterile level of cleanliness which substantially prevents the presence and growth of pathogenic microorganisms including *Listeria*, said food processing rooms each being individually atmospherically and structurally isolated from each other to effectively prevent any contamination in any one such food processing room or series-associated food processing elements therein from contaminating food products processed in any other of such plurality of food processing rooms and series-associated food processing elements therein;
   at least one food product delivery area, each delivery area adjacent to at least some of the food processing rooms, each delivery area to be at a second level of cleanliness that can be below the first level of cleanliness;
   at least one packaged food receiving area, each receiving area adjacent to at least some of the food processing rooms, each receiving area to be at a third level of cleanliness that can be below the first and second levels of cleanliness;
   at least one buffer area adjacent to at least one of the at least one receiving area or at least one delivery area, the buffer area to be at least at the third level of cleanliness that can be below the first and second level of cleanliness;
   at least one common area adjacent to the at least one buffer area, each common area to be at a fourth level of cleanliness that can be below the third level of cleanliness;
   a plurality of sanitizing stations, at least one sanitizing station located between a common area and a buffer area and at least one sanitizing station located between a buffer area and an adjacent receiving or delivery area;
   the method comprising:
   requiring persons entering the at least one buffer area to have undergone a first sanitizing procedure prior to or upon entering that buffer area;
   requiring persons remaining in the at least one buffer area or exiting a buffer area into the receiving area to wear a first-type set of clothing; and
   requiring persons exiting the buffer area into the at least one delivery area or a food processing room to wear a second-type set of clothing;
   limiting access to the delivery area, the receiving area and the food processing rooms to persons having at least a first predetermined level of food safety training;
   limiting access to a food processing room to personnel operating food processing devices located in that food processing room, to supervisory personnel and to personnel maintaining that food processing room and equipment contained within that food processing room; and
   requiring persons entering the at least one delivery area, the at least one receiving area or a food processing room to have undergone a second cleaning procedure prior to or upon exiting the buffer area.

23. A method for reducing contamination by an undesirable micro-organism within a food processing facility that processes a food product, wherein the food processing facility comprises:

a plurality of food processing rooms, each food processing room comprising a secure area having a single food processing line of series-associated food processing elements comprising at least one food processing device and at least one food packaging device, each food processing room at a first substantially sterile level of cleanliness which substantially prevents the presence and growth of pathogenic microorganisms including *Listeria*, said food processing rooms each being individually atmospherically and structurally isolated from each other to effectively prevent any contamination in any one such food processing room or series-associated food processing elements therein from contaminating food products processed in any other of such plurality of food processing rooms and series-associated food processing elements therein, whereby each such single line food processing room effectively comprises a separate food processing facility;

at least one at least semi-secure food product delivery area from which treated products are delivered to at least some of the food processing rooms, each delivery area to be at a level of cleanliness that can be below the first level of cleanliness but will substantially prevent contamination of previously processed food products after at least one selected post lethality treatment of the food products;

at least one semi-secure packaged food receiving area which receives packaged processed food products from at least some of the food processing rooms, each receiving area to be at a level of cleanliness that can be below the first level of cleanliness but will substantially prevent contamination of hermetically sealed food packages within the semi-secure receiving area;

at least one at least semi-secure buffer area accessible to at least one of the at least one receiving area or at least one delivery area, the buffer area to be at least at a level of cleanliness that can be below the first level of cleanliness but will substantially prevent contamination of personnel, clean uniforms, cleaning supplies, and equipment located within such semi-secure buffer area;

at least one unsecure common area accessible to the at least one buffer area, each common area to be at a fourth level of cleanliness that can be below the level of cleanliness of the delivery area;

a plurality of sanitizing stations, at least one sanitizing station located between a common area and a buffer area and at least one sanitizing station located between a buffer area and receiving or delivery area;

the method comprising:

requiring persons entering the at least one buffer area to have undergone a first sanitizing procedure prior to or upon entering that buffer area;

requiring persons remaining in the at least one buffer area or exiting a buffer area into the receiving area to wear a first-type set of clothing; and requiring persons exiting the buffer area into the at least one delivery area or a food processing room to wear a second-type set of clothing;

limiting access to the delivery area, the receiving area and the food processing rooms to persons having at least a first predetermined level of food safety training;

limiting access to a food processing room to personnel operating food processing devices located in that food processing room, to supervisory personnel and to personnel maintaining that food processing room and equipment contained within that food processing room; and requiring persons entering the at least one delivery area, the at least one receiving area or a food processing room to have undergone a second cleaning procedure prior to or upon exiting the buffer area.

* * * * *